US008717302B1

(12) United States Patent
Qin et al.

(10) Patent No.: US 8,717,302 B1
(45) Date of Patent: May 6, 2014

(54) APPARATUS AND METHOD FOR RECOGNIZING A GESTURE ON A SENSING DEVICE

(75) Inventors: Zheng Qin, Shanghai (CN); Tao Peng, Shanghai (CN)

(73) Assignee: Cypress Semiconductor Corporation, San Jose, CA (US)

( * ) Notice: Subject to any disclaimer, the term of this patent is extended or adjusted under 35 U.S.C. 154(b) by 1022 days.

(21) Appl. No.: 11/479,498

(22) Filed: Jun. 30, 2006

(51) Int. Cl.
*G06F 3/041* (2006.01)
*G06F 3/044* (2006.01)
*G06F 3/033* (2013.01)

(52) U.S. Cl.
USPC ......................... 345/173; 178/18.06; 715/863

(58) Field of Classification Search
USPC ............ 345/173, 174, 184; 178/18.01, 18.03, 178/18.06, 19.01, 19.03, 19.06, 19.07, 178/20.01–20.04; 341/5, 33; 715/863
See application file for complete search history.

(56) References Cited

U.S. PATENT DOCUMENTS 4,459,541 A * 7/1984 Fielden et al. ................ 324/678
5,305,017 A 4/1994 Gerpheide
5,543,591 A 8/1996 Gillespie et al.
5,748,185 A 5/1998 Stephan et al.
5,943,043 A * 8/1999 Furuhata et al. .............. 345/173
5,943,052 A 8/1999 Allen et al.
6,028,271 A 2/2000 Gillespie et al.
6,037,929 A 3/2000 Ogura et al.
6,188,391 B1 2/2001 Seely et al.
6,262,717 B1 7/2001 Donohue et al.
6,380,931 B1 4/2002 Gillespie et al.
6,396,523 B1 * 5/2002 Segal et al. ................... 715/863
6,414,671 B1 7/2002 Gillespie et al.
6,704,005 B2 3/2004 Kato et al.
6,825,890 B2 11/2004 Matsufusa
7,030,860 B1 4/2006 Hsu et al.
7,030,861 B1 * 4/2006 Westerman et al. .......... 345/173
7,394,453 B2 * 7/2008 Woolley et al. ............... 345/157
2006/0026521 A1 * 2/2006 Hotelling et al. ............. 715/702
2006/0066582 A1 3/2006 Lyon et al.
2006/0066588 A1 * 3/2006 Lyon et al. .................... 345/173
2006/0097991 A1 5/2006 Hotelling et al.
2007/0120832 A1 * 5/2007 Saarinen et al. .............. 345/173
2007/0222766 A1 * 9/2007 Bolender ...................... 345/173
2007/0247435 A1 * 10/2007 Benko et al. .................. 345/173
2007/0291014 A1 * 12/2007 Layton et al. ................. 345/173
2008/0174567 A1 * 7/2008 Woolley et al. ............... 345/173

OTHER PUBLICATIONS

"Capacitance Sensing, Capacitive Switch Scan", AN2233a, Dennis Seguine, © Cypress Semiconductor Corporation, Mar. 31, 2005, pp. 1-7.*
"Capacitance Sensing, Capacitive Switch Scan", AN2233a, Dennis Sequine, Cypress Semiconductor Corporation, Mar. 31, 2005, pp. 1-7.*

(Continued)

*Primary Examiner* — Joe H Cheng
*Assistant Examiner* — Keith Crawley

(57) ABSTRACT

An apparatus and method for recognizing a gesture based on detected presences of first and second conductive objects on a sensing device. The apparatus may include a sensing device having a plurality of sensor elements to detect presences of first and second conductive objects, and a processing device, coupled to the sensing device, to recognize a gesture based on the presences of the first and second conductive objects. The recognized gesture may be scroll gestures or click-and-drag gestures.

14 Claims, 14 Drawing Sheets

(56) References Cited

OTHER PUBLICATIONS

"Capacitance Sensing, Capacitive Switch Scan", AN2233a, Dennis Seguine, Cypress Semiconductor Corporation, Mar. 31, 2005, pp. 1-7.*

Chapweske, Adam, "The PS/2 Mouse Interface", PS/2 Mouse Interfacing, 2001, 10 pages.

"CY8C21x34 Data Sheet", Cypress Semiconductor Corporation, CSR User Module, CSR v1.0, Oct. 6, 2005, pp. 1-36.

Ryan Seguine, et al., "Layout Guidelines for PSoC™ CapSense™", Cypress Application Note AN2292, Revision B, Oct. 31, 2005, pp. 1-15.

Dennis Seguine, "Capacitive Switch Scan", Cypress Application Note AN2233a, Revision B, Apr. 14, 2005, pp. 1-6.

* cited by examiner

APPARATUS AND METHOD FOR RECOGNIZING A GESTURE ON A SENSING DEVICE

TECHNICAL FIELD

This invention relates to the field of user interface devices and, in particular, to touch-sensing devices.

BACKGROUND

Computing devices, such as notebook computers, personal data assistants (PDAs), and mobile handsets, have user interface devices, which are also known as human interface device (HID). One user interface device that has become more common is a touch-sensor pad. A basic notebook touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a cursor, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch panels, or touchscreen panels are display overlays which are typically either pressure-sensitive (resistive), electrically-sensitive (capacitive), acoustically-sensitive (SAW—surface acoustic wave) or photo-sensitive (infrared). The effect of such overlays allows a display to be used as an input device, removing the keyboard and/or the mouse as the primary input device for interacting with the display's content. Such displays can be attached to computers or, as terminals, to networks. There are a number of types of touch screen technology, such as optical imaging, resistive, surface wave, capacitive, infrared, dispersive signal, and strain gauge technologies. Touch screens have become familiar in retail settings, on point of sale systems, on ATMs, on mobile handsets, on game consoles, and on PDAs where a stylus is sometimes used to manipulate the graphical user interface (GUI) and to enter data.

FIG. 1A illustrates a conventional touch-sensor pad. The touch-sensor pad 100 includes a sensing surface 101 on which a conductive object may be used to position a cursor in the x- and y-axes, or to select an item on a display. Touch-sensor pad 100 may also include two buttons, left and right buttons 102 and 103, respectively. These buttons are typically mechanical buttons, and operate much like a left and right button on a mouse. These buttons permit a user to select items on a display or send other commands to the computing device.

FIG. 1B illustrates a conventional linear touch-sensor slider. The linear touch-sensor slider 110 includes a surface area 111 on which a conductive object may be used to position a cursor in the x-axes (or alternatively in the y-axes). The construct of touch-sensor slider 110 may be the same as that of touch-sensor pad 100. Touch-sensor slider 110 may include a one-dimensional sensor array. The slider structure may include one or more sensor elements that may be conductive traces. Each trace may be connected between a conductive line and a ground. By being in contact or in proximity on a particular portion of the slider structure, the capacitance between the conductive lines and ground varies and can be detected. The capacitance variation may be sent as a signal on the conductive line to a processing device. For example, by detecting the capacitance variation of each sensor element, the position of the changing capacitance can be pinpointed. In other words, it can be determined which sensor element has detected the presence of the conductive object, and it can also be determined the motion and/or the position of the conductive object over multiple sensor elements.

One difference between touch-sensor sliders and touch-sensor pads may be how the signals are processed after detecting the conductive objects. Another difference is that the touch-sensor slider is not necessarily used to convey absolute positional information of a conducting object (e.g., to emulate a mouse in controlling cursor positioning on a display) but, rather, may be used to actuate one or more functions associated with the sensing elements of the sensing device.

In addition to detecting motion of the conductive object in one or two axes to control cursor movement, these conventional touch-sensor pads have been designed to recognize gesture features. One conventional touch-sensor pad includes methods for recognizing gestures made by a conductive object on a touch-sensor pad, as taught by U.S. Pat. No. 5,943,052 to Allen et al. The touch-sensor pad described in U.S. Pat. No. 5,943,052 recognizes scrolling gestures (as well as other gestures such as tapping, pushing, hopping, and zigzag gestures) by analyzing the position, pressure, and movement of the conductive object on the sensor pad during the time of a suspected gesture, and sends signals to a host indicating the occurrence of these gestures.

The touch-sensor pad described in U.S. Pat. No. 5,943,052 includes touch-sensor pad and packet processor, which determines the position of the conductive object, such as a finger, that is proximate to, or touching, a sensing surface. A finger is present if the pressure exceeds a suitable threshold value. This conventional touch-sensor pad also includes a scroll zone, having a central axis. After detecting a user running a finger on the touch-sensor pad in a direction substantially parallel to an axis running the length of the scroll zone, the processor software sends scrolling messages to the operating system or application that owns an active window of a graphical user interface (GUI). Conversely, the packet processing software is configured to not scroll on motions that are not substantially parallel to the axis of the scroll zone. This avoids unwanted interference with normal program functions. The packet processing software also stops scrolling when the user lifts the scroll-activating finger or moves the finger in a direction substantially perpendicular to the scroll zone. The scroll zone could be vertical, or horizontal, or otherwise located on the touch-sensor pad to enable access for the user and proper alignment with the location of scroll bar on the GUI.

FIG. 1C illustrates a conventional touch-sensor pad 100 having a vertical scroll zone 104. The touch-sensor pad 100 includes a sensing surface 101 on which a conductive object may be used to position a cursor in the x- and y-axes, or to select an item on a display. Touch-sensor pad 100 also includes vertical scroll zone 104. Vertical scroll zone 104 is a defined area on the sensing surface 101 that is dedicated to perform scrolling operations when the conditions for a scroll gesture are met. The vertical scroll zone 104, in particular, is used to perform scroll-up and scroll-down operations. If the absolute position of the finger in a first axis (X axis) is detected in the scroll zone 104, and the motion is detecting in a positive direction in a second axis (Y axis), a scroll-up gesture is recognized, and accordingly, a scroll-up operation will be performed. Similarly, if the absolute position in the X axis is in the scroll zone 104, and the motion is detected in a negative direction in the Y axis, a scroll-down gesture is recognized to perform the scroll-down operation.

FIG. 1D illustrates a conventional touch-sensor pad 100 having a horizontal scroll zone 105. Touch-sensor pad 100 also includes horizontal scroll zone 105. Horizontal scroll zone 105 is a defined area on the sensing surface 101 that is dedicated to perform scrolling operations when the conditions for a scroll gesture are met. The horizontal scroll zone 105, in particular, is used to perform scroll-left and scroll-right operations. If the absolute position of the finger in a first axis (Y axis) is detected in the scroll zone 105, and the motion is detecting in a positive direction in a second axis (X axis), a scroll-right gesture is recognized, and accordingly, a scroll-right operation will be performed. Similarly, if the absolute position in the Y axis is in the scroll zone 105, and the motion is detected in a negative direction in the X axis, a scroll-left gesture is recognized to perform the scroll-left operation.

BRIEF DESCRIPTION OF THE DRAWINGS

The present invention is illustrated by way of example, and not by way of limitation, in the figures of the accompanying drawings.

DETAILED DESCRIPTION

Figure 1A:
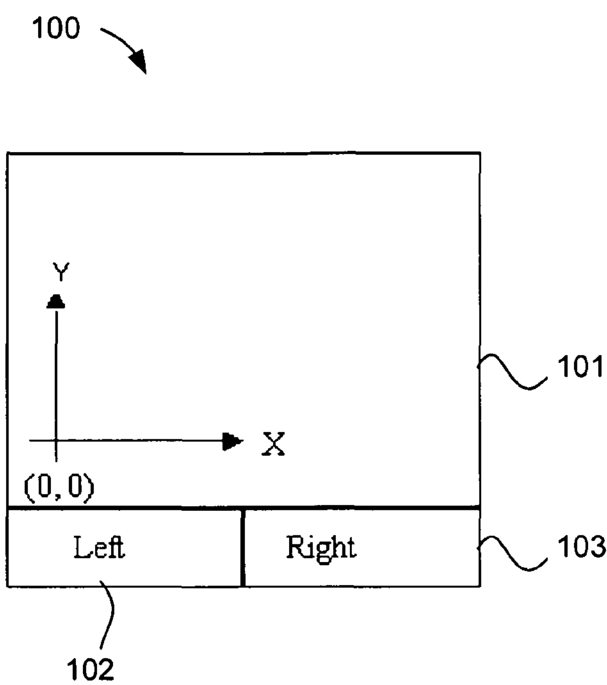
FIG. 1A illustrates a conventional touch-sensor pad.
Figure 1B:
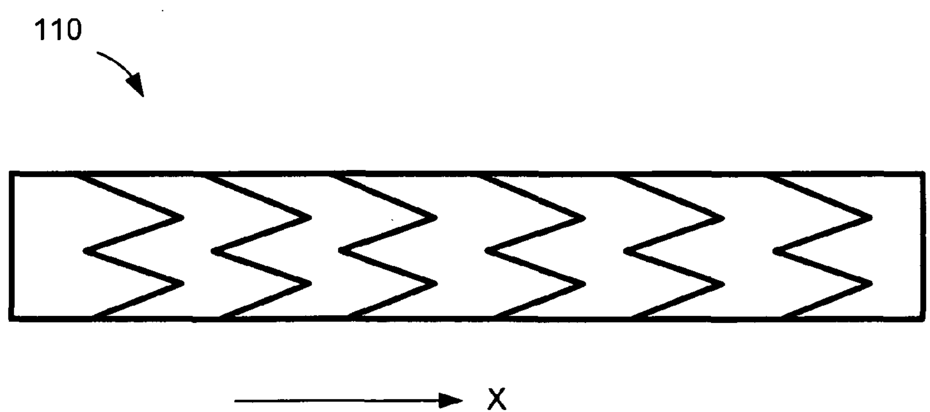
FIG. 1B illustrates a conventional linear touch-sensor slider.
Figure 1C:
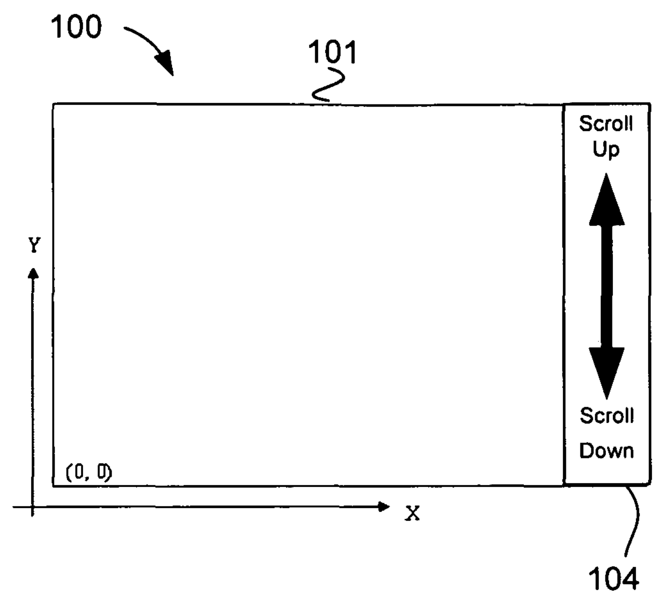
FIG. 1C illustrates a conventional touch-sensor pad having a vertical scroll zone.
Figure 1D:
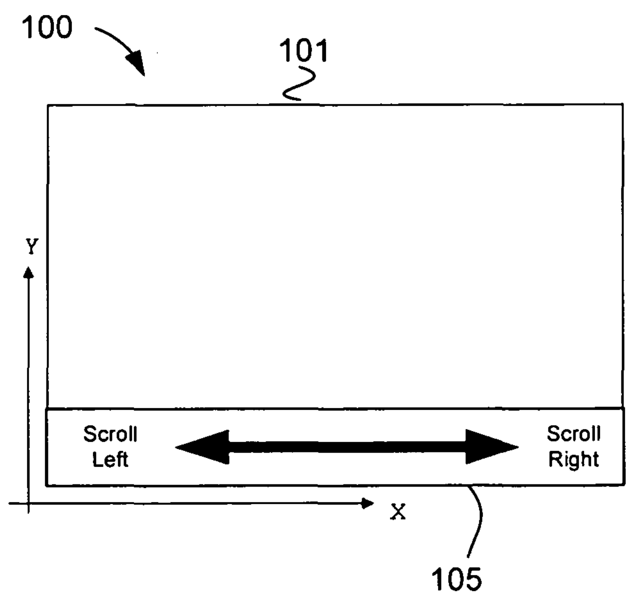
FIG. 1D illustrates a conventional touch-sensor pad having a horizontal scroll zone.

Described herein is a method and apparatus for recognizing a gesture based on detected presences of first and second conductive objects on a sensing device. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of a method and apparatus are described to detect presences of first and second conductive objects on a sensing device, and to recognize a gesture based on the detected presences. In one embodiment, the apparatus may include a sensing device having a plurality of sensor elements to detect presences of first and second conductive objects, and a processing device, coupled to the sensing device, to recognize a gesture based on the presences of the first and second conductive objects. The gesture may be scroll gestures, drag gestures, or click-and-drag gestures (e.g., locking drag gesture).

In order to perform a scroll gesture, a first finger is placed on the touch-sensor pad. This first finger should be substantially static or stationary once placed on the touch-sensor pad. If the first finger moves it may be recognized as motion for performing cursor positioning, and may not be recognized as a scroll gesture. While the first finger is present on the touch-sensor, a second finger is placed on the touch-sensor pad. If these two fingers are in vertical direction, then every tap means scroll up/down once. If these two fingers are in horizontal direction, then every tap means scroll left/right once. Alternatively, if the second finger is above or below the first finger in a vertical direction, a scroll up/down operation will be performed so long as the second finger is present on the touch-sensor pad. Similarly, if the second finger is to one side of the first finger in a horizontal direction, a scroll left/right operation will be performed so long as the second finger is present on the touch-sensor pad. Accordingly, the touch-sensor pad and the processing device are configured to detect a static conductive object, and a second non-static object to recognize gestures (e.g., scroll gestures), while the conventional touch-sensor pads are configured to detect one conductive object in a defined zone to recognize certain gestures (e.g., scroll gestures).

In comparing the positions of the two conductive objects, the processing device determines the difference in the X and Y coordinates, and compares them to threshold values. If the difference in the X coordinate is smaller than a given threshold value, the gestures are recognized to be scroll-left/right gestures. If the difference in Y coordinate is smaller than a given threshold value, the gestures are recognized to be scroll-up/down gestures.

Figure 2:
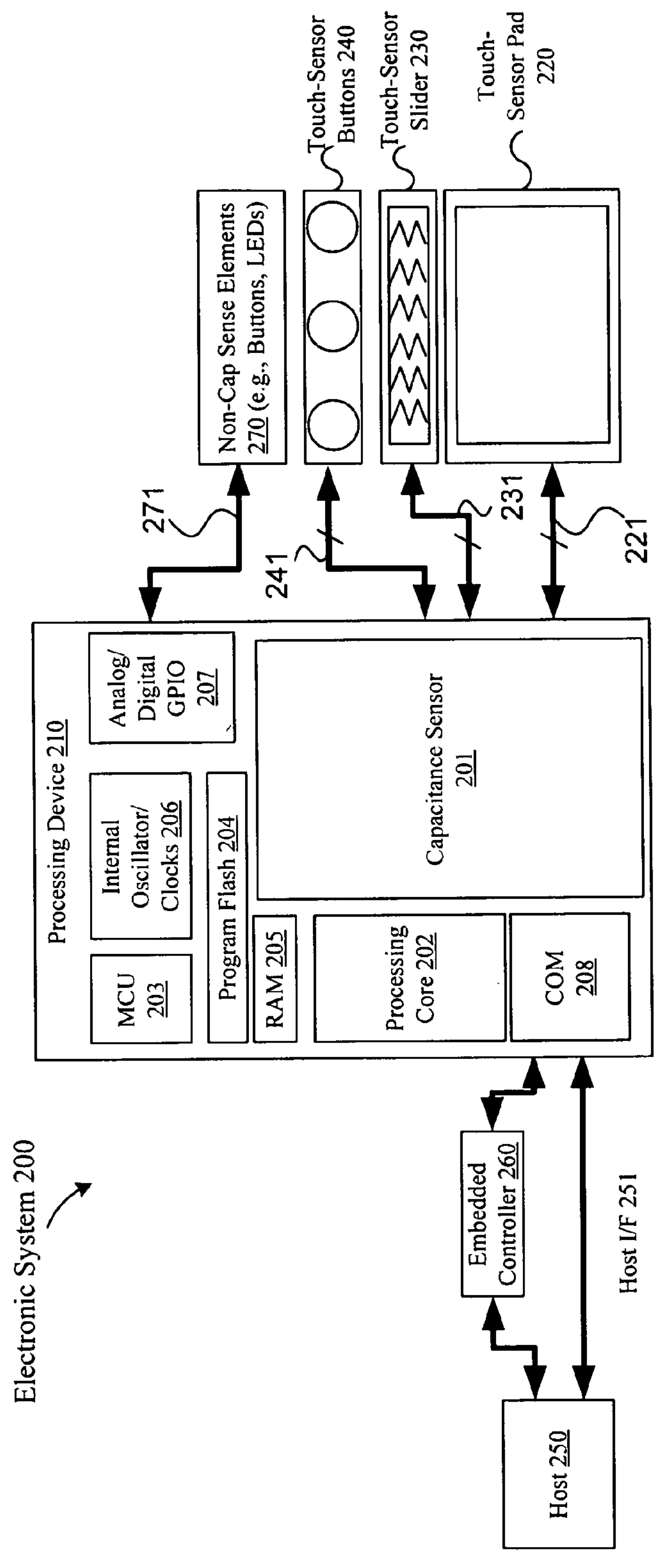
FIG. 2 illustrates a block diagram of one embodiment of an electronic system having a processing device for detecting a presence of a conductive object.

FIG. 2 illustrates a block diagram of one embodiment of an electronic system having a processing device for detecting a presence of a conductive object. Electronic system 200 includes processing device 210, touch-sensor pad 220, touch-sensor slider 230, touch-sensor buttons 240, host processor 250, embedded controller 260, and non-capacitance sensor elements 270. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnect between GPIO ports 207 and a digital block array of the processing device 210 (not illustrated). The digital block array may be configured to implement a variety of digital logic circuits (e.g., DAC, digital filters, digital control systems, etc.) using, in one embodiment, configurable user modules ("UMs"). The digital block array may be coupled to a system bus. Processing device 210 may also include memory, such as random access memory (RAM) 205 and program flash 204. RAM 205 may be static RAM (SRAM), and program flash 204 may be a non-volatile storage, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Analog block array also may be configured to implement a variety of analog circuits (e.g., ADC, analog filters, etc.) using, in one embodiment, configurable UMs. The analog block array may also be coupled to the GPIO 207.

As illustrated, capacitance sensor 201 may be integrated into processing device 210. Capacitance sensor 201 may include analog I/O for coupling to an external component, such as touch-sensor pad 220, touch-sensor slider 230, touch-sensor buttons 240, and/or other devices. Capacitance sensor 201 and processing device 202 are described in more detail below.

It should be noted that the embodiments described herein are not limited to touch-sensor pads for notebook implementations, but can be used in other capacitive sensing implementations, for example, the sensing device may be a touch screen, a touch-sensor slider 230, or a touch-sensor button 240 (e.g., capacitance sensing button). It should also be noted that the embodiments described herein may be implemented in other sensing technologies than capacitive sensing, such as resistive, optical imaging, surface wave, infrared, dispersive signal, and strain gauge technologies. Similarly, the operations described herein are not limited to notebook cursor operations, but can include other operations, such as lighting control (dimmer), volume control, graphic equalizer control, speed control, or other control operations requiring gradual adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition and numeric keypad operation.

In one embodiment, the electronic system 200 includes a touch-sensor pad 220 coupled to the processing device 210 via bus 221. Touch-sensor pad 220 may include a multi-dimension sensor array. The multi-dimension sensor array includes multiple sensor elements, organized as rows and columns. In another embodiment, the electronic system 200 includes a touch-sensor slider 230 coupled to the processing device 210 via bus 231. Touch-sensor slider 230 may include a single-dimension sensor array. The single-dimension sensor array includes multiple sensor elements, organized as rows, or alternatively, as columns. In another embodiment, the electronic system 200 includes a touch-sensor button 240 coupled to the processing device 210 via bus 241. Touch-sensor button 240 may include a single-dimension or multi-dimension sensor array. The single- or multi-dimension sensor array includes multiple sensor elements. For a touch-sensor button, the sensor elements may be coupled together to detect a presence of a conductive object over the entire surface of the sensing device. Alternatively, the touch-sensor button 240 has a single sensor element to detect the presence of the conductive object. In one embodiment, the touch-sensor button 240 may be a capacitance sensor element. Capacitance sensor elements may be used as non-contact switches. These switches, when protected by an insulating layer, offer resistance to severe environments.

The electronic system 200 may include any combination of one or more of the touch-sensor pad 220, touch-sensor slider 230, and/or touch-sensor button 240. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, or other functional keys that do not require capacitance sensing. In one embodiment, buses 271, 241, 231, and 221 may be a single bus. Alternatively, these buses may be configured into any combination of one or more separate buses.

The processing device may also provide value-added functionality such as keyboard control integration, LEDs, battery charger and general purpose I/O, as illustrated as non-capacitance sensor elements 270. Non-capacitance sensor elements 270 are coupled to the GPIO 207.

Processing device 210 may include internal oscillator/clocks 206 and communication block 208. The oscillator/clocks block 206 provides clock signals to one or more of the components of processing device 210. Communication block 208 may be used to communicate with an external component, such as a host processor 250, via host interface (I/F) line 251. Alternatively, processing block 210 may also be coupled to embedded controller 260 to communicate with the external components, such as host 250. Interfacing to the host 250 can be through various methods. In one exemplary embodiment, interfacing with the host 250 may be done using a standard PS/2 interface to connect to an embedded controller 260, which in turn sends data to the host 250 via low pin count (LPC) interface. In some instances, it may be beneficial for the processing device 210 to do both touch-sensor pad and keyboard control operations, thereby freeing up the embedded controller 260 for other housekeeping functions. In another exemplary embodiment, interfacing may be done using a universal serial bus (USB) interface directly coupled to the host 250 via host interface line 251. Alternatively, the processing device 210 may communicate to external components, such as the host 250 using industry standard interfaces, such as USB, PS/2, inter-integrated circuit (I2C) bus, or system packet interfaces (SPI). The host 250 and/or embedded controller 260 may be coupled to the processing device 210 with a ribbon or flex cable from an assembly, which houses the sensing device and processing device.

In one embodiment, the processing device 210 is configured to communicate with the embedded controller 260 or the host 250 to send and/or receive data. The data may be a command or alternatively a signal. In an exemplary embodiment, the electronic system 200 may operate in both standard-mouse compatible and enhanced modes. The standard-mouse compatible mode utilizes the HID class drivers already built into the Operating System (OS) software of host 250. These drivers enable the processing device 210 and sensing device to operate as a standard cursor control user interface device, such as a two-button PS/2 mouse. The enhanced mode may enable additional features such as scrolling (reporting absolute position) or disabling the sensing device, such as when a mouse is plugged into the notebook. Alternatively, the processing device 210 may be configured to communicate with the embedded controller 260 or the host 250, using non-OS drivers, such as dedicated touch-sensor pad drivers, or other drivers known by those of ordinary skill in the art.

In other words, the processing device 210 may operate to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes click, double-click, movement of the cursor, scroll-up, scroll-down, scroll-left, scroll-right, step Back, and step Forward. Alternatively, other user interface device commands may be communicated to the host 250 from the processing device 210. These commands may be based on gestures occurring on the sensing device that are recognized by the processing device, such as tap, push, hop, and zigzag gestures. Alternatively, other commands may be recognized. Similarly, signals may be sent that indicate the recognition of these operations.

In particular, a tap gesture, for example, may be when the finger (e.g., conductive object) is on the sensing device for less than a threshold time. If the time the finger is placed on the touchpad is greater than the threshold time it may be considered to be a movement of the cursor, in the x- or y-axes. Scroll-up, scroll-down, scroll-left, and scroll-right, step back, and step-forward may be detected when the absolute position of the conductive object is within a pre-defined area, and movement of the conductive object is detected.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be a Programmable System on a Chip (PSoC™) processing device, manufactured by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 210 may also be done in the host.

In one embodiment, the method and apparatus described herein may be implemented in a fully self-contained touch-sensor pad, which outputs fully processed x/y movement and gesture data signals or data commands to a host. In another embodiment, the method and apparatus may be implemented in be a touch-sensor pad, which outputs x/y movement data and also finger presence data to a host, and where the host processes the received data to detect gestures. In another embodiment, the method and apparatus may be implemented in a touch-sensor pad, which outputs raw capacitance data to a host, where the host processes the capacitance data to compensate for quiescent and stray capacitance, and calculates x/y movement and detects gestures by processing the capacitance data. Alternatively, the method and apparatus may be implemented in a touch-sensor pad, which outputs pre-processed capacitance data to a host, where the touchpad processes the capacitance data to compensate for quiescent and stray capacitance, and the host calculates x/y movement and detects gestures from the pre-processed capacitance data.

In one embodiment, the electronic system that includes the embodiments described herein may be implemented in a conventional laptop touch-sensor pad. Alternatively, it may be implemented in a wired or wireless keyboard integrating a touch-sensor pad, which is itself connected to a host. In such an implementation, the processing described above as being performed by the "host" may be performed in part or in whole by the keyboard controller, which may then pass fully processed, pre-processed or unprocessed data to the system host. In another embodiment, the embodiments may be implemented in a mobile handset (e.g., cell phone) or other electronic devices where the touch-sensor pad may operate in one of two or more modes. For example, the touch-sensor pad may operate either as a touch-sensor pad for x/y positioning and gesture recognition, or as a keypad or other array of touch-sensor buttons and/or sliders.

Capacitance sensor 201 may be integrated into the IC of the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 201.

It should be noted that the components of electronic system 200 may include all the components described above. Alternatively, electronic system 200 may include only some of the components described above.

In one embodiment, electronic system 200 may be used in a notebook computer. Alternatively, the electronic device may be used in other applications, such as a mobile handset, a personal data assistant (PDA), a keyboard, a television, a remote control, a monitor, a handheld multi-media device, a handheld video player, a handheld gaming device, or a control panel.

In one embodiment, capacitance sensor 201 may be a capacitive switch relaxation oscillator (CSR). The CSR may have an array of capacitive touch switches using a current-programmable relaxation oscillator, an analog multiplexer, digital counting functions, and high-level software routines to compensate for environmental and physical switch variations. The switch array may include combinations of independent switches, sliding switches (e.g., touch-sensor slider), and touch-sensor pads implemented as a pair of orthogonal sliding switches. The CSR may include physical, electrical, and software components. The physical component may include the physical switch itself, typically a pattern constructed on a printed circuit board (PCB) with an insulating cover, a flexible membrane, or a transparent overlay. The electrical component may include an oscillator or other means to convert a changed capacitance into a measured signal. The electrical component may also include a counter or timer to measure the oscillator output. The software component may include detection and compensation software algorithms to convert the count value into a switch detection decision. For example, in the case of slide switches or X-Y touch-sensor pads, a calculation for finding position of the conductive object to greater resolution than the physical pitch of the switches may be used.

It should be noted that there are various known methods for measuring capacitance. Although the embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, or the like.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may require very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in the processing device 210. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 3A:
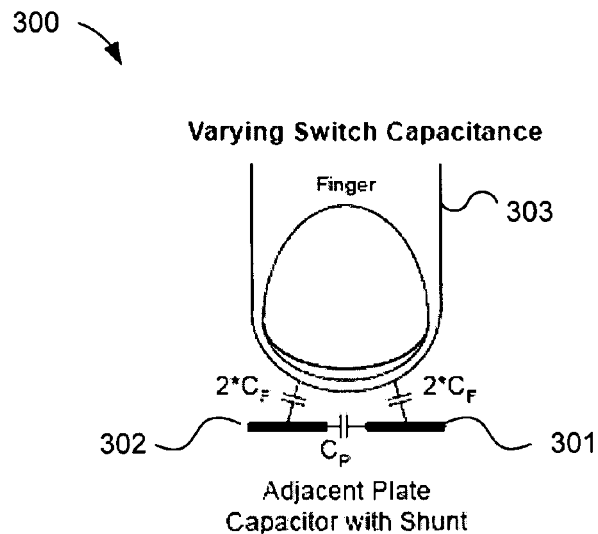
FIG. 3A illustrates a varying switch capacitance.

FIG. 3A illustrates a varying switch capacitance. In its basic form, a capacitive switch 300 is a pair of adjacent plates 301 and 302. There is a small edge-to-edge capacitance Cp, but the intent of switch layout is to minimize the base capacitance Cp between these plates. When a conductive object 303 (e.g., finger) is placed in proximity to the two plate 301 and 302, there is a capacitance 2*Cf between one electrode 301 and the conductive object 303 and a similar capacitance 2*Cf between the conductive object 303 and the other electrode 302. The capacitance between one electrode 301 and the conductive object 303 and back to the other electrode 302 adds in parallel to the base capacitance Cp between the plates 301 and 302, resulting in a change of capacitance Cf. Capacitive switch 300 may be used in a capacitance switch array. The capacitance switch array is a set of capacitors where one side of each is grounded. Thus, the active capacitor (as represented in FIG. 3C as capacitor 351) has only one accessible side. The presence of the conductive object 303 increases the capacitance (Cp+Cf) of the switch 300 to ground. Determining switch activation is then a matter of measuring change in the capacitance (Cf) or capacitance variation. Switch 300 is also known as a grounded variable capacitor. In one exemplary embodiment, Cf may range from approximately 10-30 picofarads (pF). Alternatively, other ranges may be used.

The conductive object in this case is a finger, alternatively, this technique may be applied to any conductive object, for example, a conductive door switch, position sensor, or conductive pen in a stylus tracking system (e.g., stylus).

Figure 3B:
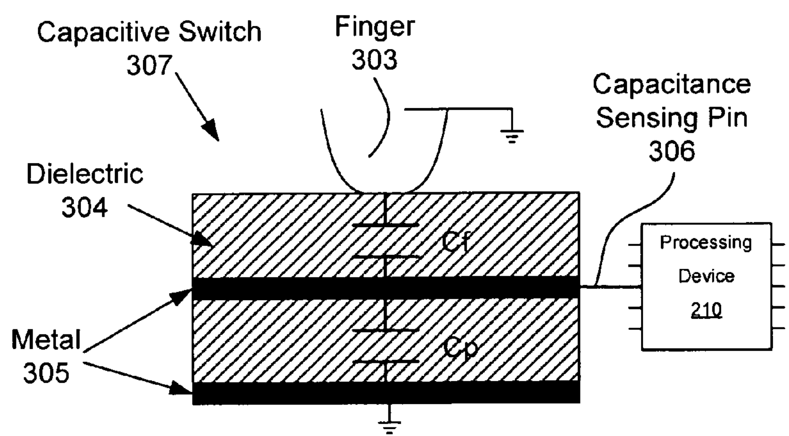
FIG. 3B illustrates one embodiment of a sensing device coupled to a processing device.
Figure 3C:
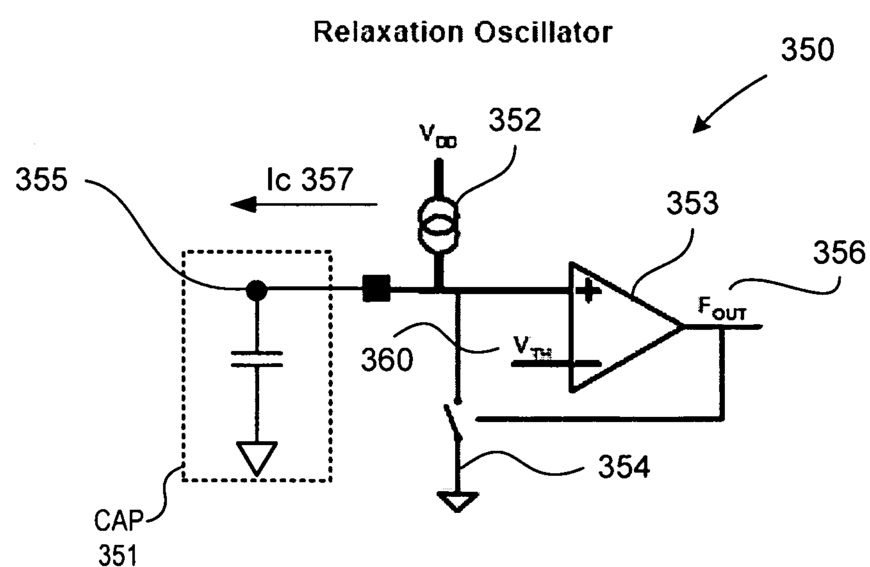
FIG. 3C illustrates one embodiment of a relaxation oscillator.

FIG. 3B illustrates one embodiment of a capacitive switch 307 coupled to a processing device 210. Capacitive switch 307 illustrates the capacitance as seen by the processing device 210 on the capacitance sensing pin 306. As described above, when a conductive object 303 (e.g., finger) is placed in proximity to one of the metal plates 305, there is a capacitance, Cf, between the metal plate and the conductive object 303 with respect to ground. Also, there is a capacitance, Cp, between the two metal plates. Accordingly, the processing device 210 can measure the change in capacitance, capacitance variation Cf, as the conductive object is in proximity to the metal plate 305. Above and below the metal plate that is closest to the conductive object 303 is dielectric material 304. The dielectric material 304 above the metal plate 305 can be the overlay, as described in more detail below. The overlay may be non-conductive material used to protect the circuitry to environmental elements and to insulate the user's finger (e.g., conductive object) from the circuitry. Capacitance switch 307 may be a sensor element of a touch-sensor pad, a touch-sensor slider, or a touch-sensor button.

FIG. 3C illustrates one embodiment of a relaxation oscillator. The relaxation oscillator 350 is formed by the capacitance to be measured on capacitor 351, a charging current source 352, a comparator 353, and a reset switch 354. It should be noted that capacitor 351 is representative of the capacitance measured on a sensor element of a sensor array. The relaxation oscillator is coupled to drive a charging current (Ic) 357 in a single direction onto a device under test ("DUT") capacitor, capacitor 351. As the charging current piles charge onto the capacitor 351, the voltage across the capacitor increases with time as a function of Ic 357 and its capacitance C. Equation (1) describes the relation between current, capacitance, voltage and time for a charging capacitor.

$$CdV=I_c dt \qquad (1)$$

The relaxation oscillator begins by charging the capacitor 351 from a ground potential or zero voltage and continues to pile charge on the capacitor 351 at a fixed charging current Ic 357 until the voltage across the capacitor 351 at node 355 reaches a reference voltage or threshold voltage, $V_{TH}$ 360. At the threshold voltage $V_{TH}$ 360, the relaxation oscillator allows the accumulated charge at node 355 to discharge (e.g., the capacitor 351 to "relax" back to the ground potential) and then the process repeats itself. In particular, the output of comparator 353 asserts a clock signal $F_{OUT}$ 356 (e.g., $F_{OUT}$ 356 goes high), which enables the reset switch 354. This resets the voltage on the capacitor at node 355 to ground and the charge cycle starts again. The relaxation oscillator outputs a relaxation oscillator clock signal ($F_{OUT}$ 356) having a frequency ($f_{RO}$) dependent upon capacitance C of the capacitor 351 and charging current Ic 357.

The comparator trip time of the comparator 353 and reset switch 354 add a fixed delay. The output of the comparator 353 is synchronized with a reference system clock to guarantee that the comparator reset time is long enough to completely reset the charging voltage on capacitor 351. This sets a practical upper limit to the operating frequency. For example, if capacitance C of the capacitor 351 changes, then $f_{RO}$ will change proportionally according to Equation (1). By comparing $f_{RO}$ of $F_{OUT}$ 356 against the frequency ($f_{REF}$) of a known reference system clock signal (REF CLK), the change in capacitance ΔC can be measured. Accordingly, equations (2) and (3) below describe that a change in frequency between $F_{OUT}$ 356 and REF CLK is proportional to a change in capacitance of the capacitor 351.

$$\Delta C \propto \Delta f, \text{ where} \tag{2}$$

$$\Delta f = f_{RO} - f_{REF}. \tag{3}$$

In one embodiment, a frequency comparator may be coupled to receive relaxation oscillator clock signal ($F_{OUT}$ 356) and REF CLK, compare their frequencies $f_{RO}$ and $f_{REF}$, respectively, and output a signal indicative of the difference Δf between these frequencies. By monitoring Δf one can determine whether the capacitance of the capacitor 351 has changed.

In one exemplary embodiment, the relaxation oscillator 350 may be built using a programmable timer (e.g., 555 timer) to implement the comparator 353 and reset switch 354. Alternatively, the relaxation oscillator 350 may be built using other circuiting. Relaxation oscillators are known by those of ordinary skill in the art, and accordingly, additional details regarding their operation have not been included so as to not obscure the present embodiments.

Figure 4:
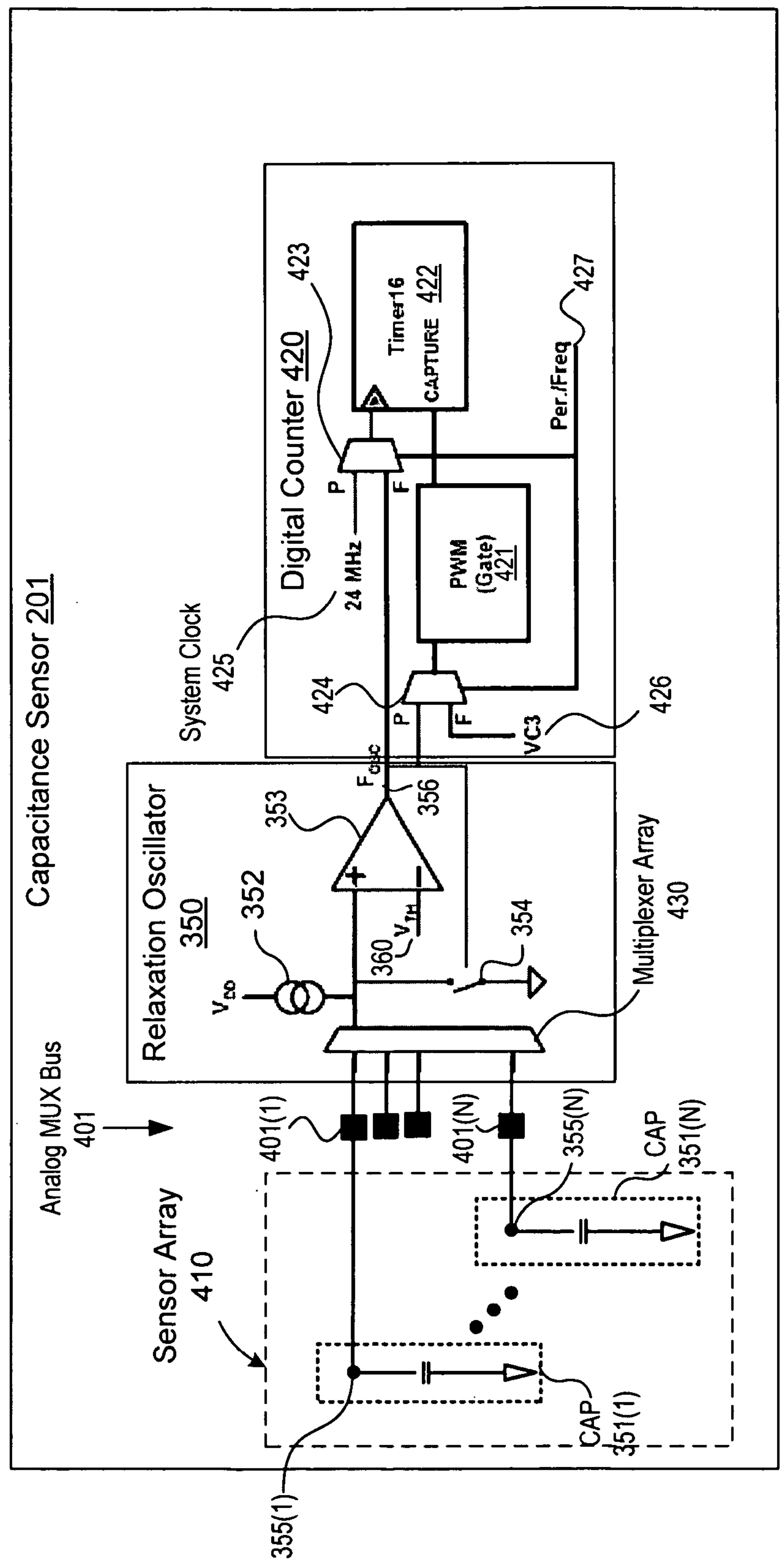
FIG. 4 illustrates a block diagram of one embodiment of a capacitance sensor including a relaxation oscillator and digital counter.

FIG. 4 illustrates a block diagram of one embodiment of a capacitance sensor including a relaxation oscillator and digital counter. Capacitance sensor 201 of FIG. 4 includes a sensor array 410 (also known as a switch array), relaxation oscillator 350, and a digital counter 420. Sensor array 410 includes sensor elements 355(1)-355(N), where N is a positive integer value that represents the number of rows (or alternatively columns) of the sensor array 410. Each sensor element is represented as a capacitor, as described above with respect to FIG. 3B. The sensor array 410 is coupled to relaxation oscillator 350 via an analog bus 401 having multiple pins 401(1)-401(N). In one embodiment, the sensor array 410 may be a single-dimension sensor array including the sensor elements 355(1)-355(N), where N is a positive integer value that represents the number of sensor elements of the single-dimension sensor array. The single-dimension sensor array 410 provides output data to the analog bus 401 of the processing device 210 (e.g., via lines 231). Alternatively, the sensor array 410 may be a multi-dimension sensor array including the sensor elements 355(1)-355(N), where N is a positive integer value that represents the number of sensor elements of the multi-dimension sensor array. The multi-dimension sensor array 410 provides output data to the analog bus 401 of the processing device 210 (e.g., via bus 221).

Relaxation oscillator 350 of FIG. 4 includes all the components described with respect to FIG. 3C, and a selection circuit 430. The selection circuit 430 is coupled to the sensor elements 355(1)-355(N), the reset switch 354, the current source 352, and the comparator 353. Selection circuit 430 may be used to allow the relaxation oscillator 350 to measure capacitance on multiple sensor elements (e.g., rows or columns). The selection circuit 430 may be configured to sequentially select a sensor element of the multiple sensor elements to provide the charge current and to measure the capacitance of each sensor element. In one exemplary embodiment, the selection circuit 430 is a multiplexer array of the relaxation oscillator 350. Alternatively, selection circuit may be other circuitry outside the relaxation oscillator 350, or even outside the capacitance sensor 201 to select the sensor element to be measured. Capacitance sensor 201 may include one relaxation oscillator and digital counter for the sensor elements of the sensor array. Alternatively, capacitance sensor 201 may include multiple relaxation oscillators and digital counters to measure capacitance on the sensor elements of the sensor array. The multiplexer array may also be used to ground the sensor elements that are not being measured. This may be done in conjunction with a dedicated pin in the GP10 port 207.

In another embodiment, the capacitance sensor 201 may be configured to simultaneously scan the sensor elements, as opposed to being configured to sequentially scan the sensor elements as described above. For example, the sensing device may include a sensor array having multiple rows and columns. The rows may be scanned simultaneously, and the columns may be scanned simultaneously.

In one exemplary embodiment, the voltages on all of the rows of the sensor array are simultaneously moved, while the voltages of the columns are held at a constant voltage, with the complete set of sampled points simultaneously giving a profile of the conductive object in a first dimension. Next, the voltages on all of the rows are held at a constant voltage, while the voltages on all the rows are simultaneously moved, to obtain a complete set of sampled points simultaneously giving a profile of the conductive object in the other dimension.

In another exemplary embodiment, the voltages on all of the rows of the sensor array are simultaneously moved in a positive direction, while the voltages of the columns are moved in a negative direction. Next, the voltages on all of the rows of the sensor array are simultaneously moved in a negative direction, while the voltages of the columns are moved in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other methods for scanning known by those of ordinary skill in the art may be used to scan the sensing device.

Digital counter 420 is coupled to the output of the relaxation oscillator 350. Digital counter 420 receives the relaxation oscillator output signal 356 ($F_{OUT}$). Digital counter 420 is configured to count at least one of a frequency or a period of the relaxation oscillator output received from the relaxation oscillator.

As described above with respect to the relaxation oscillator 350, when a finger or conductive object is placed on the switch, the capacitance increases from Cp to Cp+Cf so the relaxation oscillator output signal 356 ($F_{OUT}$) decreases. The relaxation oscillator output signal 356 ($F_{OUT}$) is fed to the digital counter 420 for measurement. There are two methods for counting the relaxation oscillator output signal 356, frequency measurement and period measurement. In one embodiment, the digital counter 420 may include two multiplexers 423 and 424. Multiplexers 423 and 424 are configured to select the inputs for the PWM 421 and the timer 422 for the two measurement methods, frequency and period measurement methods. Alternatively, other selection circuits may be used to select the inputs for the PWM 421 and the timer 422. In another embodiment, multiplexers 423 and 424 are not included in the digital counter, for example, the digital counter 420 may be configured in one, or the other, measurement configuration.

In the frequency measurement method, the relaxation oscillator output signal 356 is counted for a fixed period of time. The timer 422 is read to obtain the number of counts during the gate time. This method works well at low frequencies where the oscillator reset time is small compared to the oscillator period. A pulse width modulator (PWM) 421 is clocked for a fixed period by a derivative of the system clock, VC3 426 (which is a divider from system clock 425, e.g., 24 MHz). Pulse width modulation is a modulation technique that generates variable-length pulses to represent the amplitude of an analog input signal; in this case VC3 426. The output of PWM 421 enables timer 422 (e.g., 16-bit). The relaxation oscillator output signal 356 clocks the timer 422. The timer 422 is reset at the start of the sequence, and the count value is read out at the end of the gate period.

In the period measurement method, the relaxation oscillator output signal 356 gates a timer 422, which is clocked by the system clock 425 (e.g., 24 MHz). In order to improve sensitivity and resolution, multiple periods of the oscillator are counted with the PWM 421. The output of PWM 421 is used to gate the timer 422. In this method, the relaxation oscillator output signal 356 drives the clock input of PWM 421. As described above, pulse width modulation is a modulation technique that generates variable-length pulses to represent the amplitude of an analog input signal; in this case the relaxation oscillator output signal 356. The output of the PWM 421 enables timer 422 (e.g., 16-bit), which is clocked at the system clock frequency 425 (e.g., 24 MHz). When the output of PWM 421 is asserted (e.g., goes high), the count starts by releasing the capture control. When the terminal count of the PWM 421 is reached, the capture signal is asserted (e.g., goes high), stopping the count and setting the PWM's interrupt. The timer value is read in this interrupt. The relaxation oscillator 350 is indexed to the next switch (e.g., capacitor 351(2)) to be measured and the count sequence is started again.

The two counting methods may have equivalent performance in sensitivity and signal-to-noise ratio (SNR). The period measurement method may have a slightly faster data acquisition rate, but this rate is dependent on software loads and the values of the switch capacitances. The frequency measurement method has a fixed-switch data acquisition rate.

The length of the timer 422 and the detection time required for the switch are determined by sensitivity requirements. Small changes in the capacitance on capacitor 351 result in small changes in frequency. In order to find these small changes, it may be necessary to count for a considerable time.

At startup (or boot) the switches (e.g., capacitors 351(1)-(N)) are scanned and the count values for each switch with no actuation are stored as a baseline array (Cp). The presence of a finger on the switch is determined by the difference in counts between a stored value for no switch actuation and the acquired value with switch actuation, referred to here as Δn. The sensitivity of a single switch is approximately:

$$\frac{\Delta n}{n} = \frac{Cf}{Cp} \tag{4}$$

The value of Δn should be large enough for reasonable resolution and clear indication of switch actuation. This drives switch construction decisions.

Cf should be as large a fraction of Cp as possible. In one exemplary embodiment, the fraction of Cf/Cp ranges between approximately 0.01 to approximately 2.0. Alternatively, other fractions may be used for Cf/Cp. Since Cf is determined by finger area and distance from the finger to the switch's conductive traces (through the over-lying insulator), the baseline capacitance Cp should be minimized. The baseline capacitance Cp includes the capacitance of the switch pad plus any parasitics, including routing and chip pin capacitance.

In switch array applications, variations in sensitivity should be minimized. If there are large differences in Δn, one switch may actuate at 1.0 cm, while another may not actuate until direct contact. This presents a non-ideal user interface device. There are numerous methods for balancing the sensitivity. These may include precisely matching on-board capacitance with PC trace length modification, adding balance capacitors on each switch's PC board trace, and/or adapting a calibration factor to each switch to be applied each time the switch is tested.

In one embodiment, the PCB design may be adapted to minimize capacitance, including thicker PCBs where possible. In one exemplary embodiment, a 0.062 inch thick PCB is used. Alternatively, other thicknesses may be used, for example, a 0.015 inch thick PCB.

It should be noted that the count window should be long enough for Δn to be a "significant number." In one embodiment, the "significant number" can be as little as 10, or alternatively, as much as several hundred. In one exemplary embodiment, where Cf is 1.0% of Cp (a typical "weak" switch), and where the switch threshold is set at a count value of 20, n is found to be:

$$n = \Delta n \cdot \frac{Cf}{Cp} = 2000 \tag{5}$$

Adding some margin to yield 2500 counts, and running the frequency measurement method at 1.0 MHz, the detection time for the switch is 2.5 microseconds. In the frequency measurement method, the frequency difference between a switch with and without actuation (i.e., CP+CF vs. CP) is approximately:

$$\Delta n = \frac{t_{count} \cdot i_c}{V_{TH}} \frac{Cf}{Cp^2} \tag{6}$$

This shows that the sensitivity variation between one channel and another is a function of the square of the difference in the two channels' static capacitances. This sensitivity difference can be compensated using routines in the high-level Application Programming Interfaces (APIs).

In the period measurement method, the count difference between a switch with and without actuation (i.e., CP+CF vs. CP) is approximately:

$$\Delta n = N_{Periods} \cdot \frac{Cf \cdot V_{TH}}{i_c} \cdot f_{SysClk} \quad (7)$$

The charge currents are typically lower and the period is longer to increase sensitivity, or the number of periods for which $f_{SysClk}$ is counted can be increased. In either method, by matching the static (parasitic) capacitances Cp of the individual switches, the repeatability of detection increases, making all switches work approximately at the same difference. Compensation for this variation can be done in software at runtime. The compensation algorithms for both the frequency method and period method may be included in the high-level APIs.

Some implementations of this circuit use a current source programmed by a fixed-resistor value. If the range of capacitance to be measured changes, external components, (i.e., the resistor) should be adjusted.

Using the multiplexer array 430, multiple sensor elements may be sequentially scanned to provide current to and measure the capacitance from the capacitors (e.g., sensor elements), as described above. In other words, while one sensor element is being measured, the remaining sensor elements are grounded using the GPIO port 207. This drive and multiplex arrangement bypasses the existing GPIO to connect the selected pin to an internal analog multiplexer (mux) bus. The capacitor charging current (e.g., current source 352) and reset switch 354 are connected to the analog mux bus. This may limit the pin-count requirement to simply the number of switches (e.g., capacitors 351(1)-351(N)) to be addressed. In one exemplary embodiment, no external resistors or capacitors are required inside or outside the processing device 210 to enable operation.

The capacitor charging current for the relaxation oscillator 350 is generated in a register programmable current output DAC (also known as IDAC). Accordingly, the current source 352 is a current DAC or IDAC. The IDAC output current may be set by an 8-bit value provided by the processing device 210, such as from the processing core 202. The 8-bit value may be stored in a register or in memory.

Estimating and measuring PCB capacitances may be difficult; the oscillator-reset time may add to the oscillator period (especially at higher frequencies); and there may be some variation to the magnitude of the IDAC output current with operating frequency. Accordingly, the optimum oscillation frequency and operating current for a particular switch array may be determined to some degree by experimentation.

In many capacitive switch designs the two "plates" (e.g., 301 and 302) of the sensing capacitor are actually adjacent sensor elements that are electrically isolated (e.g., PCB pads or traces), as indicated in FIG. 3A. Typically, one of these plates is grounded. Layouts for touch-sensor slider (e.g., linear slide switches) and touch-sensor pad applications have switches that are immediately adjacent. In this case, all of the switches that are not active are grounded through the GPIO 207 of the processing device 210 dedicated to that pin. The actual capacitance between adjacent plates is small (Cp), but the capacitance of the active plate (and its PCB trace back to the processing device 210) to ground, when detecting the presence of the conductive object 303, may be considerably higher (Cp+Cf). The capacitance of two parallel plates is given by the following equation:

$$C = \varepsilon_0 \cdot \varepsilon_R \cdot \frac{A}{d} = \varepsilon_R \cdot 8.85 \cdot \frac{A}{d} pF/\text{m} \quad (8)$$

The dimensions of equation (8) are in meters. This is a very simple model of the capacitance. The reality is that there are fringing effects that substantially increase the switch-to-ground (and PCB trace-to-ground) capacitance.

Switch sensitivity (i.e., actuation distance) may be increased by one or more of the following: 1) increasing board thickness to increase the distance between the active switch and any parasitics; 2) minimizing PC trace routing underneath switches; 3) utilizing a grided ground with 50% or less fill if use of a ground plane is absolutely necessary; 4) increasing the spacing between switch pads and any adjacent ground plane; 5) increasing pad area; 6) decreasing thickness of any insulating overlay; or 7) verifying that there is no air-gap between the PC pad surface and the touching finger.

There is some variation of switch sensitivity as a result of environmental factors. A baseline update routine, which compensates for this variation, may be provided in the high-level APIs.

Sliding switches are used for control requiring gradual adjustments. Examples include a lighting control (dimmer), volume control, graphic equalizer, and speed control. These switches are mechanically adjacent to one another. Actuation of one switch results in partial actuation of physically adjacent switches. The actual position in the sliding switch is found by computing the centroid location of the set of switches activated.

In applications for touch-sensor sliders (e.g., sliding switches) and touch-sensor pads it is often necessary to determine finger (or other capacitive object) position to more resolution than the native pitch of the individual switches. The contact area of a finger on a sliding switch or a touch-pad is often larger than any single switch. In one embodiment, in order to calculate the interpolated position using a centroid, the array is first scanned to verify that a given switch location is valid. The requirement is for some number of adjacent switch signals to be above a noise threshold. When the strongest signal is found, this signal and those immediately adjacent are used to compute a centroid:

$$\text{Centroid} = \frac{n_{i-1} \cdot (i-1) + n_i i + n_{i+1} \cdot (i+1)}{n_{i-1} + n_i i + n_{i+1}} \quad (9)$$

The calculated value will almost certainly be fractional. In order to report the centroid to a specific resolution, for example a range of 0 to 100 for 12 switches, the centroid value may be multiplied by a calculated scalar. It may be more efficient to combine the interpolation and scaling operations into a single calculation and report this result directly in the desired scale. This may be handled in the high-level APIs. Alternatively, other methods may be used to interpolate the position of the conductive object.

A physical touchpad assembly is a multi-layered module to detect a conductive object. In one embodiment, the multi-layer stack-up of a touchpad assembly includes a PCB, an adhesive layer, and an overlay. The PCB includes the processing device 210 and other components, such as the connector to the host 250, necessary for operations for sensing the capacitance. These components are on the non-sensing side of the PCB. The PCB also includes the sensor array on the opposite side, the sensing side of the PCB. Alternatively, other multi-layer stack-ups may be used in the touchpad assembly.

The PCB may be made of standard materials, such as FR4 or Kapton™ (e.g., flexible PCB). In either case, the processing device 210 may be attached (e.g., soldered) directly to the sensing PCB (e.g., attached to the non-sensing side of the PCB). The PCB thickness varies depending on multiple variables, including height restrictions and sensitivity requirements. In one embodiment, the PCB thickness is at least approximately 0.3 millimeters (mm). Alternatively, the PCB may have other thicknesses. It should be noted that thicker PCBs may yield better results. The PCB length and width is dependent on individual design requirements for the device on which the sensing device is mounted, such as a notebook or mobile handset.

The adhesive layer is directly on top of the PCB sensing array and is used to affix the overlay to the overall touchpad assembly. Typical material used for connecting the overlay to the PCB is non-conductive adhesive such as 3M 467 or 468. In one exemplary embodiment, the adhesive thickness is approximately 0.05 mm. Alternatively, other thicknesses may be used.

The overlay may be non-conductive material used to protect the PCB circuitry to environmental elements and to insulate the user's finger (e.g., conductive object) from the circuitry. Overlay can be ABS plastic, polycarbonate, glass, or polyester film, such as Mylar™ polyester film. Alternatively, other materials known by those of ordinary skill in the art may be used. In one exemplary embodiment, the overlay has a thickness of approximately 1.0 mm. In another exemplary embodiment, the overlay thickness has a thickness of approximately 2.0 mm. Alternatively, other thicknesses may be used.

The sensor array may be a grid-like pattern of sensor elements (e.g., capacitive elements) used in conjunction with the processing device 210 to detect a presence of a conductive object, such as finger, to a resolution greater than that which is native. The touch-sensor pad layout pattern maximizes the area covered by conductive material, such as copper, in relation to spaces necessary to define the rows and columns of the sensor array.

Figure 5A:
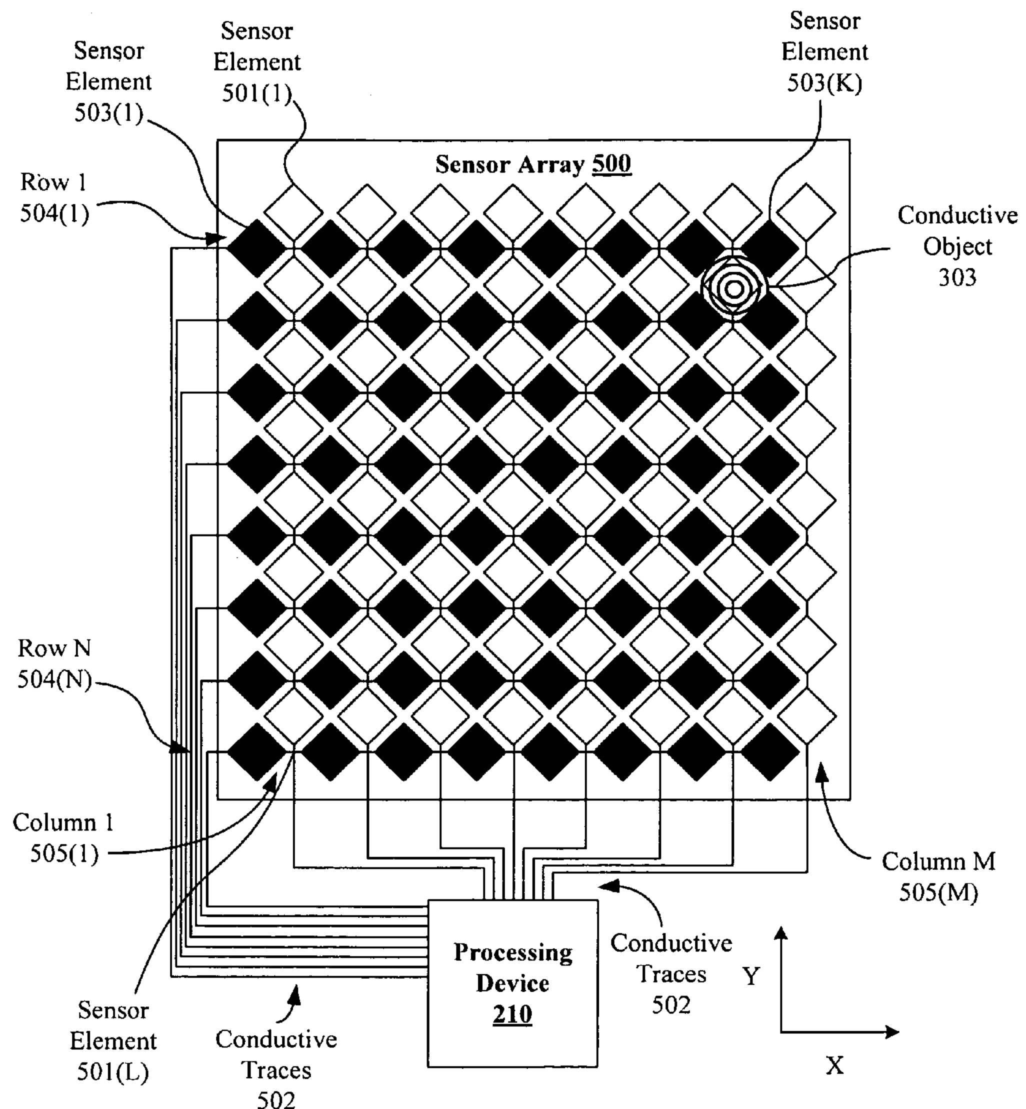
FIG. 5A illustrates a top-side view of one embodiment of a sensor array having a plurality of sensor elements for detecting a presence of a conductive object on the sensor array of a touch-sensor pad.

FIG. 5A illustrates a top-side view of one embodiment of a sensor array of sensor elements for detecting a presence of a conductive object 303 on the sensor array 500 of a touch-sensor pad. Touch-sensor pad 220 includes a sensor array 500. Sensor array 500 includes rows 504(1)-504(N) and columns 505(1)-505(M), where N is a positive integer value representative of the number of rows and M is a positive integer value representative of the number of columns. Each row includes sensor elements 503(1)-503(K), where K is a positive integer value representative of the number of sensor elements in the row. Each column includes a sensor elements 501(1)-501(L), where L is a positive integer value representative of the number of sensor elements in the column. Accordingly, sensor array is an N×M sensor matrix. The N×M sensor matrix, in conjunction with the processing device 210, is configured to detect a position of a presence of the conductive object 303 in the x-, and y-directions.

Figure 5B:
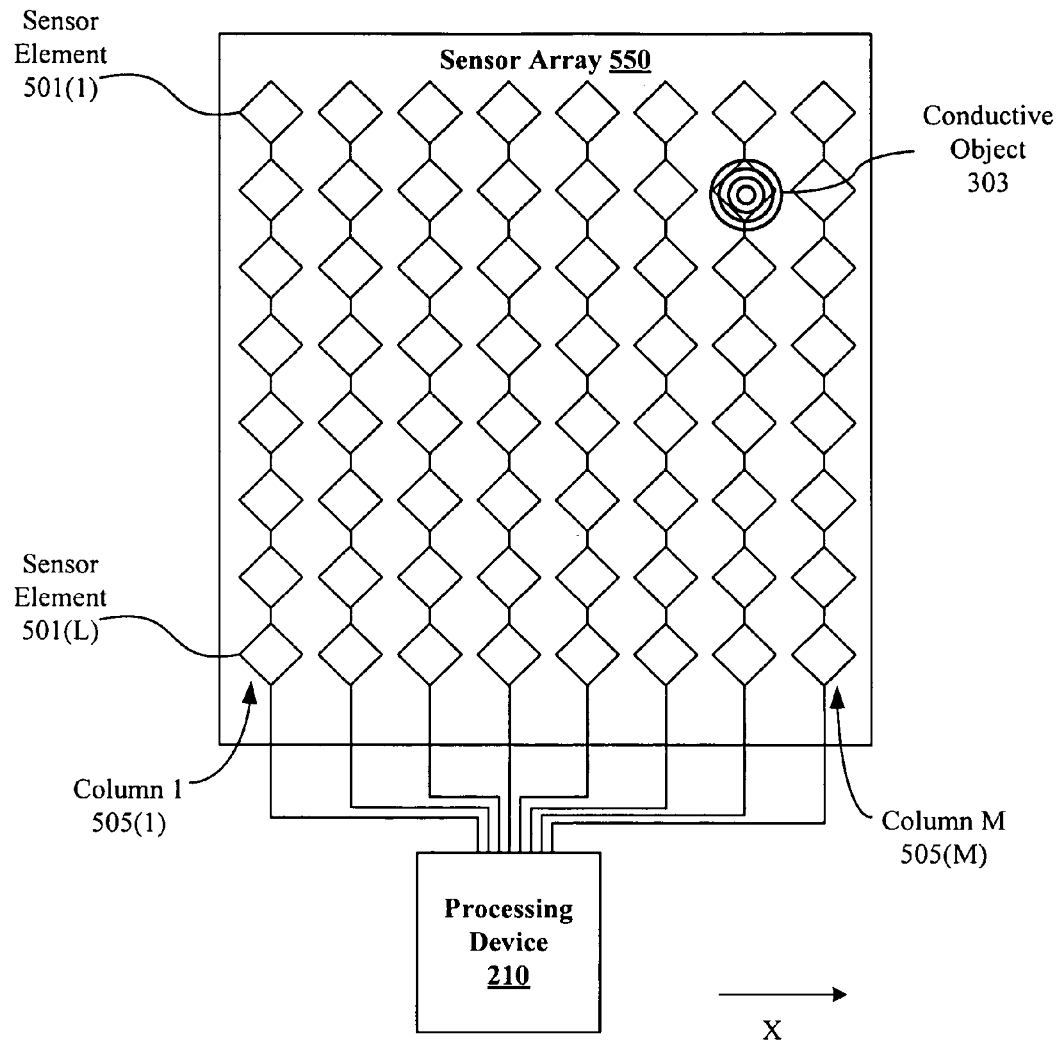
FIG. 5B illustrates a top-side view of one embodiment of a sensor array having a plurality of sensor elements for detecting a presence of a conductive object on the sensor array of a touch-sensor slider.

FIG. 5B illustrates a top-side view of one embodiment of a sensor array of sensor elements for detecting a presence of a conductive object 303 on the sensor array 550 of a touch-sensor slider. Touch-sensor slider 230 includes a sensor array 550. Sensor array 550 includes columns 504(1)-504(M), where M is a positive integer value representative of the number of columns. Each column includes sensor elements 501(1)-501(L), where L is a positive integer value representative of the number of sensor elements in the column. Accordingly, sensor array is a 1×M sensor matrix. The 1×M sensor matrix, in conjunction with the processing device 210, is configured to detect a position of a presence of the conductive object 303 in the x-direction. It should be noted that sensor array 500 may be configured to function as a touch-sensor slider 230.

Alternating columns in FIG. 5A correspond to x- and y-axis elements. The y-axis sensor elements 503(1)-503(K) are illustrated as black diamonds in FIG. 5A, and the x-axis sensor elements 501(1)-501(L) are illustrated as white diamonds in FIG. 5A and FIG. 5B. It should be noted that other shapes may be used for the sensor elements. In another embodiment, the columns and row may include vertical and horizontal bars (e.g., rectangular shaped bars); however, this design may include additional layers in the PCB to allow the vertical and horizontal bars to be positioned on the PCB so that they are not in contact with one another.

Figure 5C:
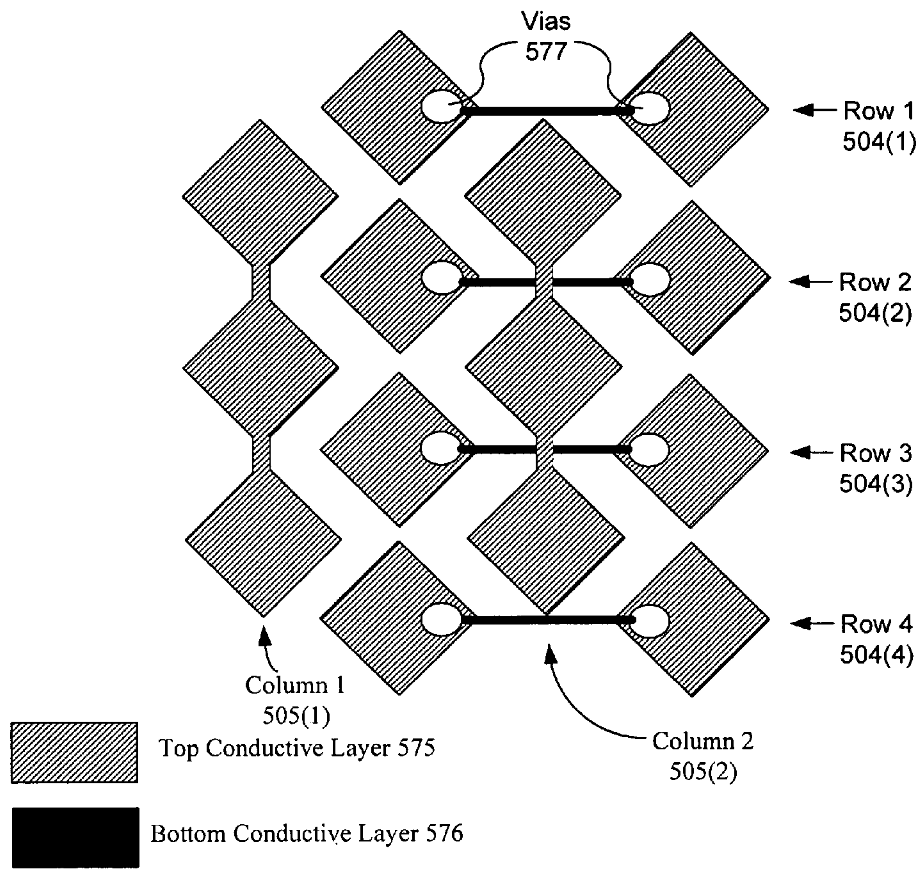
FIG. 5C illustrates a top-side view of one embodiment of a two-layer touch-sensor pad.
Figure 5D:
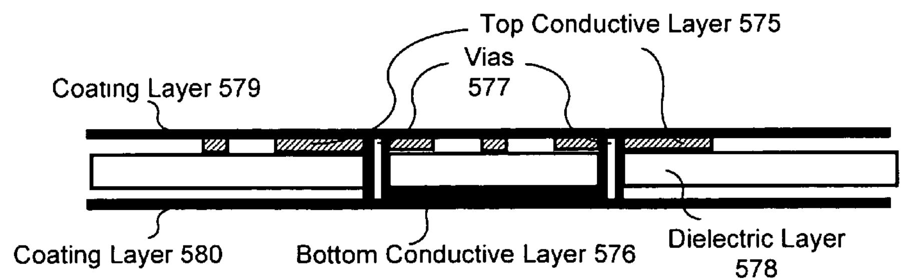
FIG. 5D illustrates a side view of one embodiment of the two-layer touch-sensor pad of FIG. 5C.

FIGS. 5C and 5D illustrate top-side and side views of one embodiment of a two-layer touch-sensor pad. Touch-sensor pad, as illustrated in FIGS. 5C and 5D, include the first two columns 505(1) and 505(2), and the first four rows 504(1)-504(4) of sensor array 500. The sensor elements of the first column 501(1) are connected together in the top conductive layer 575, illustrated as hashed diamond sensor elements and connections. The diamond sensor elements of each column, in effect, form a chain of elements. The sensor elements of the second column 501(2) are similarly connected in the top conductive layer 575. The sensor elements of the first row 504(1) are connected together in the bottom conductive layer 576 using vias 577, illustrated as black diamond sensor elements and connections. The diamond sensor elements of each row, in effect, form a chain of elements. The sensor elements of the second, third, and fourth rows 504(2)-504(4) are similarly connected in the bottom conductive layer 576.

As illustrated in FIG. 5D, the top conductive layer 575 includes the sensor elements for both the columns and the rows of the sensor array, as well as the connections between the sensor elements of the columns of the sensor array. The bottom conductive layer 576 includes the conductive paths that connect the sensor elements of the rows that reside in the top conductive layer 575. The conductive paths between the sensor elements of the rows use vias 577 to connect to one another in the bottom conductive layer 576. Vias 577 go from the top conductive layer 575, through the dielectric layer 578, to the bottom conductive layer 576. Coating layers 579 and 580 are applied to the surfaces opposite to the surfaces that are coupled to the dielectric layer 578 on both the top and bottom conductive layers 575 and 576.

It should be noted that the space between coating layers 579 and 580 and dielectric layer 578, which does not include any conductive material, may be filled with the same material as the coating layers or dielectric layer. Alternatively, it may be filled with other materials.

It should be noted that the present embodiments are not be limited to connecting the sensor elements of the rows using vias to the bottom conductive layer 576, but may include connecting the sensor elements of the columns using vias to the bottom conductive layer 576. Furthermore, the present embodiments are not limited two-layer configurations, but may include disposing the sensor elements on multiple layers, such as three- or four-layer configurations.

When pins are not being sensed (only one pin is sensed at a time), they are routed to ground. By surrounding the sensing device (e.g., touch-sensor pad) with a ground plane, the exterior elements have the same fringe capacitance to ground as the interior elements.

In one embodiment, an IC including the processing device 210 may be directly placed on the non-sensor side of the PCB. This placement does not necessary have to be in the center. The processing device IC is not required to have a specific set of dimensions for a touch-sensor pad, nor a certain number of pins. Alternatively, the IC may be placed somewhere external to the PCB.

Figure 6A:
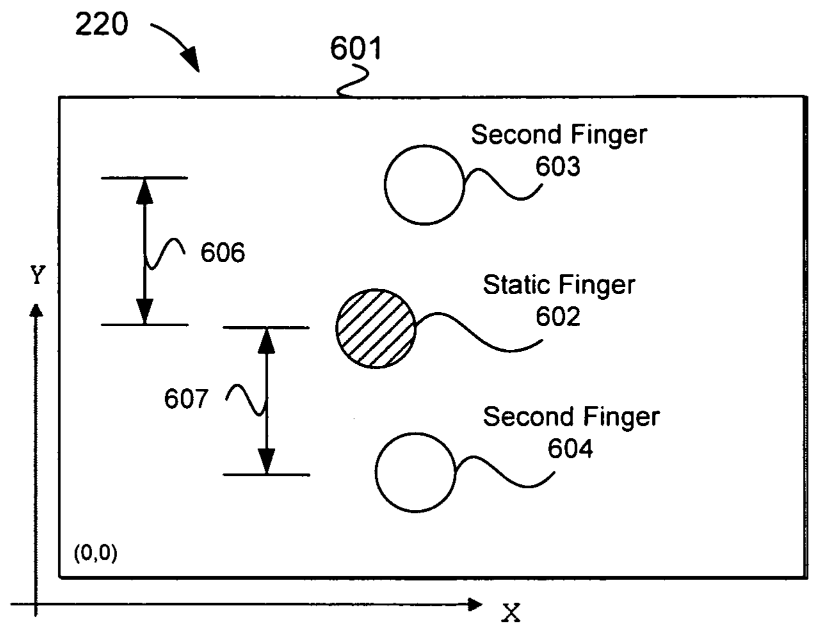
FIG. 6A illustrates one embodiment of a touch-sensor pad having a sensing surface for recognizing scroll gestures on the touch-sensor pad.

FIG. 6A illustrates one embodiment of a touch-sensor pad 220 having a sensing surface 601 for recognizing scroll gestures on the touch-sensor pad. Touch-sensor pad 220 and processing device 210 are configured to detect a presence of a first conductive object, static finger 602, on sensing surface 601. A first position may be determined from the detected presence of static finger 602. Touch-sensor pad 220 and processing device 210 are configured to detect a presence of a second conductive object, second finger 603. A second position may be determined from the detected presence of second finger 603. Processing device 210 can determine a difference 606 in position of the two fingers 602 and 603. The difference 606 is a positive difference in the Y axis, and accordingly, processing device 210 recognizes a scroll-up gesture based on the two positions of the two fingers.

Similarly, processing device 210 may detect the static finger 602 and the second finger 604. Processing device 210 determines the positions of the two fingers, and compares the position's to determine the difference 607. Difference 607 is a negative difference in the Y axis, and accordingly, processing device 210 recognizes a scroll-down gesture based on the two positions of the two fingers.

In one embodiment, processing device 210 recognizes the scroll gestures so long as the presence of the second finger (e.g., 603 or 604) is detected. In other words, as the second finger is lifted off of the sensing surface 601, the scroll operation (e.g., scroll-up or scroll-down) will stop. In another embodiment, processing device 210 recognizes a scroll gesture when it recognizes a tap gesture by the second finger (e.g., 603 or 604). In other words, the scroll-up/down operations are recognized not merely by detecting the presence of the second conductive object, but by detecting a tap gesture by the second conductive object.

In particular, a tap gesture, for example, may be when the finger 603 or 604 (e.g., conductive object) is on the sensing device for less than a threshold time. If the time the finger is placed on the touchpad is greater than the threshold time it may be considered to be a movement of the cursor, in the x- or y-axes. Scroll-up, scroll-down, scroll-left, and scroll-right, step-back, and step-forward may be detected when the second finger 603 or 604 tap is detected. Alternatively, the tap gesture may be recognized using other techniques, such as detecting a presence of the second conductive object (e.g., 603 or 604) on sensing surface 601 a sensing device (e.g., touch-sensor pad 220), determining a velocity of the detected presence of the conductive object, and recognizing a tap gesture based on the velocity. Additional details regarding detecting a tap gestures are not included so as to not obscure the discussion of the present embodiments.

Figure 6B:
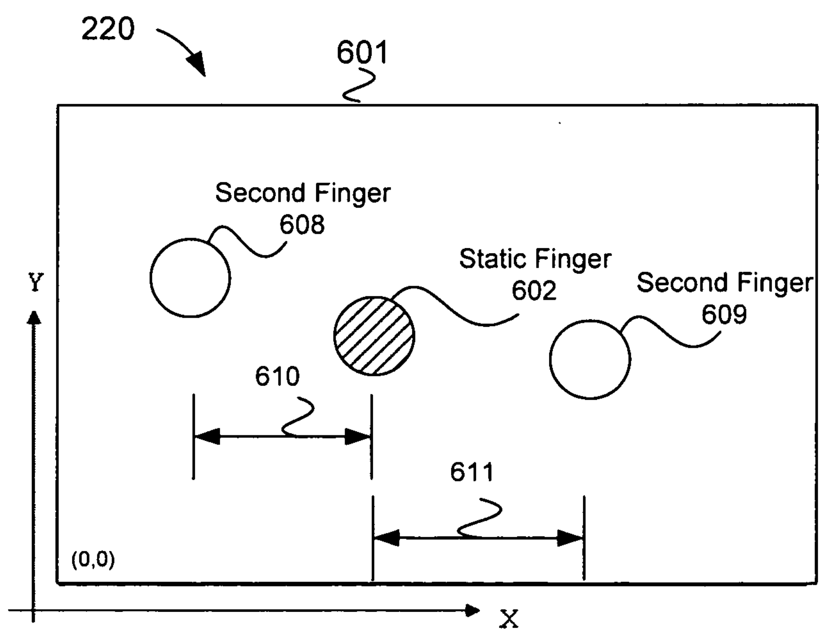
FIG. 6B illustrates another embodiment of a touch-sensor pad having a sensing surface for recognizing scroll gestures on the touch-sensor pad.

FIG. 6B illustrates another embodiment of a touch-sensor pad 220 having a sensing surface 601 for recognizing scroll gestures on the touch-sensor pad. Touch-sensor pad 220 and processing device 210 are configured to detect a presence of a first conductive object, static finger 602, on sensing surface 601. A first position may be determined from the detected presence of static finger 602. Touch-sensor pad 220 and processing device 210 are configured to detect a presence of a second conductive object, second finger 608. A second position may be determined from the detected presence of second finger 608. Processing device 210 can determine a difference 610 in position of the two fingers 602 and 608. The difference 610 is a negative difference in the X axis, and accordingly, processing device 210 recognizes a scroll-left gesture based on the two positions of the two fingers.

Similarly, processing device 210 may detect the static finger 602 and the second finger 609. Processing device 210 determines the positions of the two fingers, and compares the positions to determine the difference 611. Difference 611 is a positive difference in the X axis, and accordingly, processing device 210 recognizes a scroll-right gesture based on the two positions of the two fingers.

In one embodiment, processing device 210 recognizes the scroll gestures so long as the presence of the second finger (e.g., 608 or 609) is detected. In other words, as the second finger is lifted off of the sensing surface 601, the scroll operation (e.g., scroll-left or scroll-right) will stop. In another embodiment, processing device 210 recognizes a scroll gesture when it recognizes a tap gesture by the second finger (e.g., 608 or 609). In other words, the scroll-left/right operations are recognized not merely by detecting the presence of the second conductive object, but by detecting a tap gesture by the second conductive object.

Figure 6C:
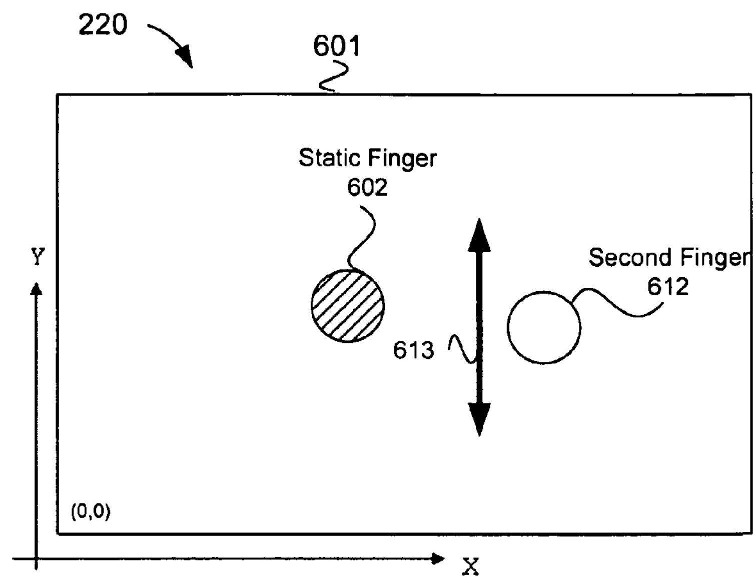
FIG. 6C illustrates another embodiment of a touch-sensor pad having a sensing surface for recognizing scroll gestures on the touch-sensor pad.

FIG. 6C illustrates another embodiment of a touch-sensor pad having a sensing surface for recognizing scroll gestures on the touch-sensor pad. Touch-sensor pad 220 and processing device 210 are configured to detect a presence of a first conductive object, static finger 602, on sensing surface 601. A first position may be determined from the detected presence of static finger 602. Touch-sensor pad 220 and processing device 210 are configured to recognize a vertical motion 613 of a second finger 612. If the vertical motion 613 is in a positive direction in the Y axis, then a scroll-up gesture is recognized. If the vertical motion 613 is in a negative direction in the Y axis, then a scroll-down gesture is recognized.

Figure 6D:
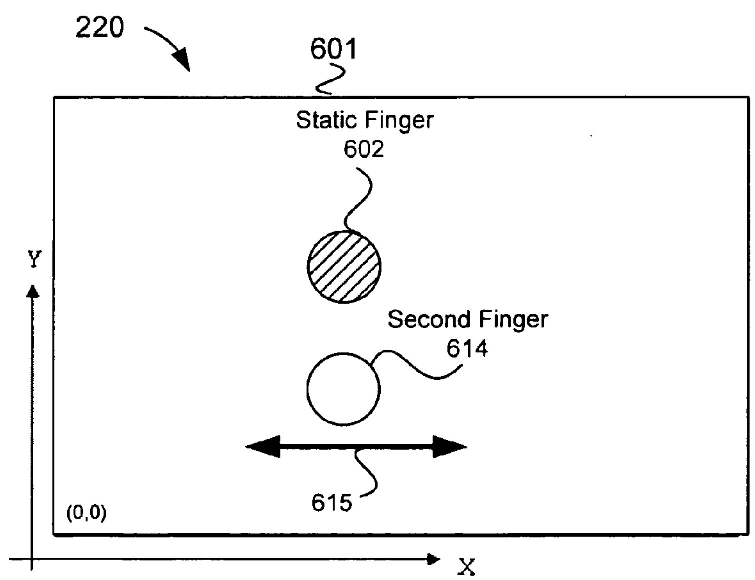
FIG. 6D illustrates another embodiment of a touch-sensor pad having a sensing surface for recognizing scroll gestures on the touch-sensor pad.

FIG. 6D illustrates another embodiment of a touch-sensor pad having a sensing surface for recognizing scroll gestures on the touch-sensor pad. Touch-sensor pad 220 and processing device 210 are configured to detect a presence of a first conductive object, static finger 602, on sensing surface 601. A first position may be determined from the detected presence of static finger 602. Touch-sensor pad 220 and processing device 210 are configured to recognize a horizontal motion 615 of a second finger 614. If the horizontal motion 615 is in a positive direction in the X axis, then a scroll-right gesture is recognized. If the horizontal motion 615 is in a negative direction in the X axis, then a scroll-left gesture is recognized.

Figure 7A:
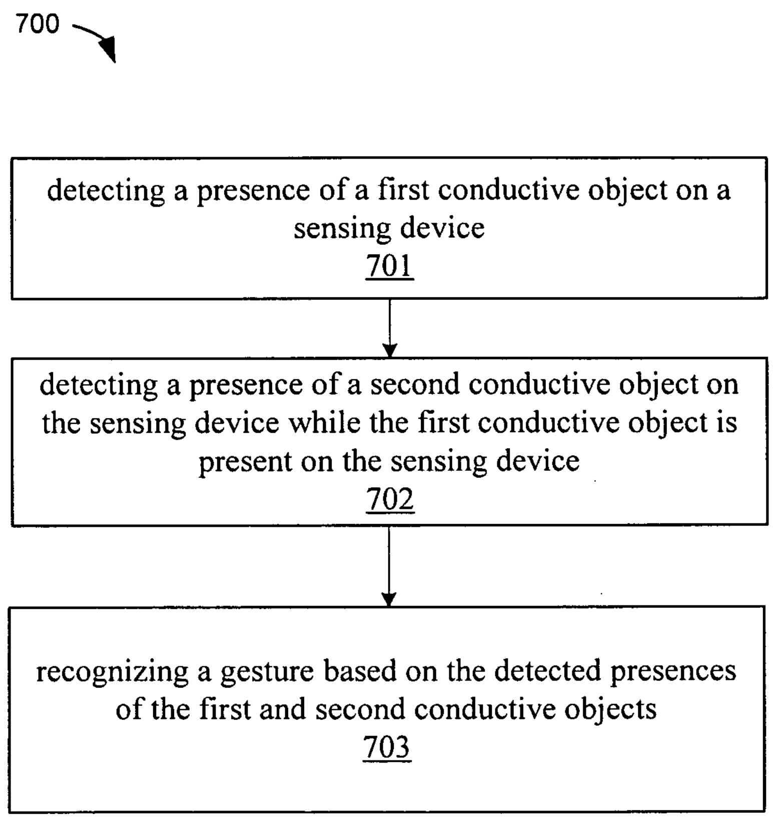
FIG. 7A illustrates a flowchart of one embodiment of a method for recognizing scroll gestures based on the presence of two conductive objects.

FIG. 7A illustrates a flowchart of one embodiment of a method for recognizing scroll gestures based on the presence of two conductive objects. Method 700 includes, first, detecting a presence of a first conductive object on a sensing device, operation 701. Second, the method includes detecting a presence of a second conductive object on the sensing device while the first conductive object is present on the sensing device, operation 702. Third, the method includes recognizing a gesture based on the detected presences of the first and second conductive objects, operation 703.

It should be noted that the positions, taps, or motions of the second object with respect to the first conductive object may be used in recognizing other gestures as described above. For example, if the second conductive object (e.g., second fingers 603, 604, 608, 609, 612, or 614) is detected below the first conductive object in the Y axis, a scroll-up gesture may be recognized, instead of a scroll-down gesture. Similarly, if the second conductive object is detected to the right of the first conductive object in the X axis, a scroll-left gesture may be recognized, instead of a scroll-right gesture. Moreover, the positions, taps, or motions of the second object with respect to the first conductive object may be used to recognize other gestures, such as drag gestures, click-and-drag gestures (e.g., locking drag gesture), tap and double-tap gestures, or the like.

In one embodiment, the operation of recognizing the gesture includes determining a first position of the presence of the first conductive object, determining a second position of the presence of the second conductive object, and recognizing a scroll gesture based on the first and second positions.

In one embodiment, the operation of recognizing the gesture includes 1) recognizing a scroll-up gesture when the second position is up from the first position in a two-dimensional plane, 2) recognizing a scroll-down gesture when the second position is down from the first position in the two-dimensional plane, 3) recognizing a scroll-right gesture when the second position is right of the first position in the two-dimensional plane, and 4) recognizing a scroll-left gesture when the second position is left of the first position in the two-dimensional plane.

In another embodiment, the operation of recognizing the gesture includes determining a first position of the presence of the first conductive object, recognizing a tap gesture of the second conductive object, determining a second position of the conductive object, and recognizing a scroll gesture based on the first and second positions and the tap gesture.

In another embodiment, the operation of recognizing the gesture includes determining a first position of the presence of the first conductive object, determining a second position of the presence of the second conductive object, and detecting a motion of the second conductive object from the second position. Accordingly, a drag gesture is recognized based on the motion and the first and second positions of the first and second conductive objects. This method may further include determining a direction of the motion of the second conductive object. Based on the direction, the following gestures may be recognized: a drag-up gesture when the direction is upward from the second position in a two-dimensional plane; a drag-down gesture when the direction is downward from the second position in the two-dimensional plane; a drag-right gesture when the direction is towards the right of the second position in the two-dimensional plane; and a scroll-left gesture when the second position is towards the left of the second position in the two-dimensional plane.

It should be noted that the first conductive object (first finger 602) should be substantially static. The processing device 210 may be configured to tolerate slight motions of the static finger. This may be done using techniques that are common in the industry for distinguishing between motion gestures and other gestures.

As described above, the operation of detecting the presences, motions, and/or positions of the first and second conductive objects may be performed, in one embodiment, by determining a capacitance of the conductive object on the sensing device over time. The recognition of the gesture, accordingly, is recognized based on the determined capacitance. In another embodiment, the presences, motions, and/or positions of the conductive objects may be performed by determining a capacitance of each of a plurality of sensor elements of the sensing device, and determining an average capacitance based on the capacitance of each of the plurality of sensor elements. The recognition of the gesture, accordingly, is recognized based on the determined average capacitance.

Figure 7B:
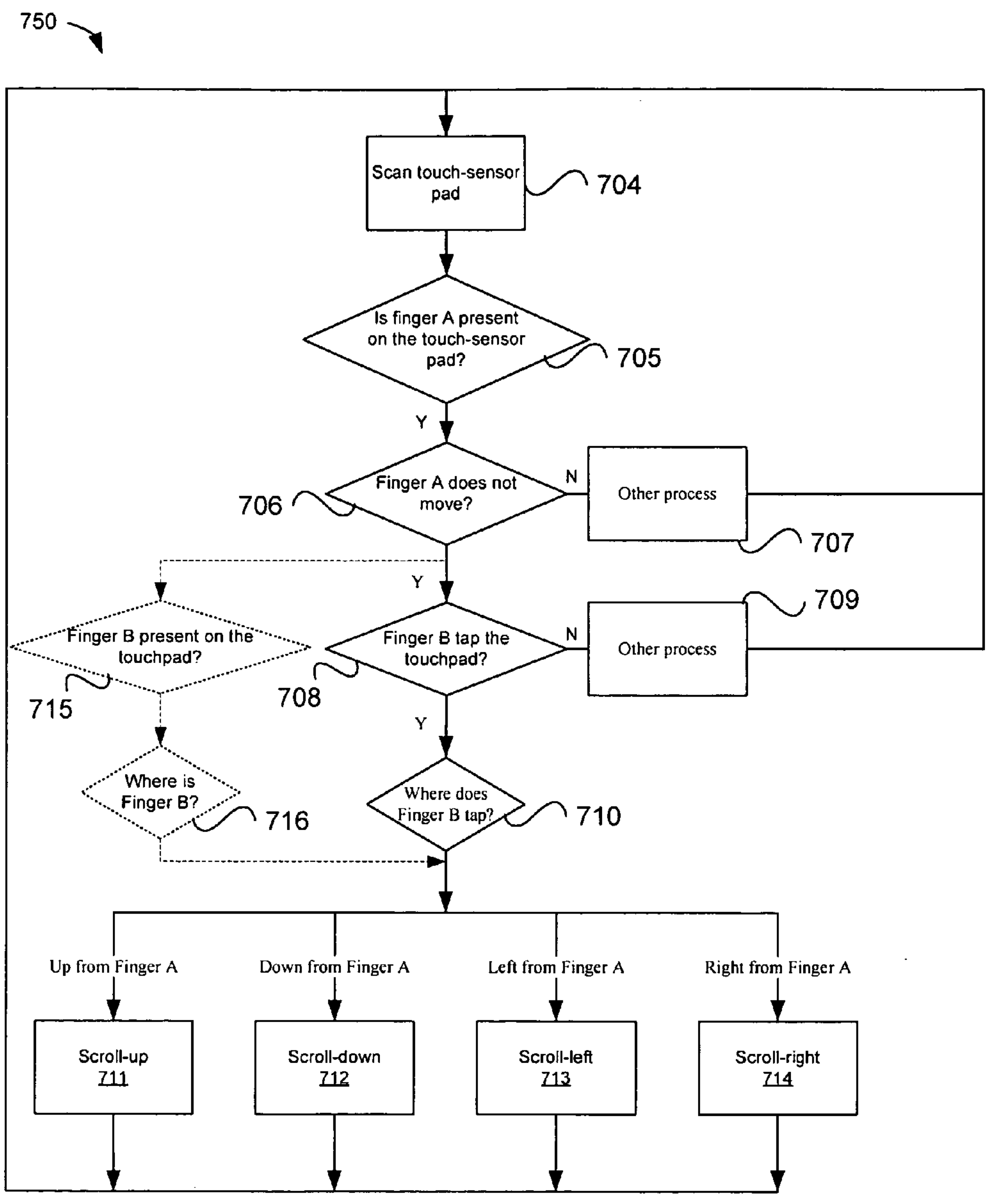
FIG. 7B illustrates a flowchart of another embodiment of a method for recognizing scroll gestures based on the presence of two conductive objects.

FIG. 7B illustrates a flowchart of another embodiment of a method for recognizing scroll gestures based on the presence of two conductive objects. Method 750 includes, first, scanning touch-sensor pad, operation 704. Second, determining if a first conductive object (e.g., finger) is on the touch-sensor pad, operation 705. The method may include determining whether the first conductive object moves, or not, operation 706. If the method determines that the first conductive object moves, then it performs some other process, such as recognizing a motion gesture or positioning a cursor, operation 707. If the method determines that the first conductive object does not move, then it determines whether a second conductive object taps the touch-sensor pad (e.g., processing device 210 recognizes a tap gesture on the sensing device), operation 708. If the method determines that the second conductive object has not tapped the touch-sensor pad, then it performs some other process, such as recognizing a motion gesture or positioning a cursor, operation 709. However, if the method determines that the second conductive object has tapped the touch-sensor pad, then the method determines where the second conductive object tapped the touch-sensor pad in relation to the position of the first conductive object, operation 710.

Based on the determination of where the tap gesture of the second conductive object was detected with respect to the position of the first conductive object, the method performs the following operations: scroll-up operation 711 when the second conductive object is determined to be from the first conductive object; scroll-down operation 712 when the second conductive object is determined to be down from the first conductive object; scroll-left operation 713 when the second conductive object is determined to be left from the first conductive object; and scroll-right operation 714 when the second conductive object is determined to be right from the first conductive object. The convention used in this embodiment may be altered so that scroll operations are based on other positioning schemes, such as, for example, scroll-up is recognized when the tap is down from the first conductive object, and likewise for the other scroll operations. As previously noted, the embodiments described herein are not limited to scroll gestures, but may include other gestures that are recognized based on detecting two conductive objects on the sensing device.

In another embodiment, the method may include identical, or similar, operations, as those described in FIG. 7B above, except operations 708 and 709 may be replaced with two different operations, operation 715 and 716 (illustrated with dotted lines in FIG. 7B). Operation 708 of determining whether the second conductive object taps the touch-sensor pad is replaced with operation 715. Operation 715 includes determining if a second conductive object is merely present on the touch-sensor pad. Accordingly, as long as the second conductive object is present on the touch-sensor pad, the scroll gesture will be recognized, and will stop when the second conductive object is no longer present (e.g., lifted off of the touch-sensor pad). Similarly, the operation that determines the position of the tap of the second conductive object is replaced with operation 716. Operation 716 includes determining the position of the presence of the second conductive object. The other operations of FIG. 7B may be performed as described above.

Figure 8A:
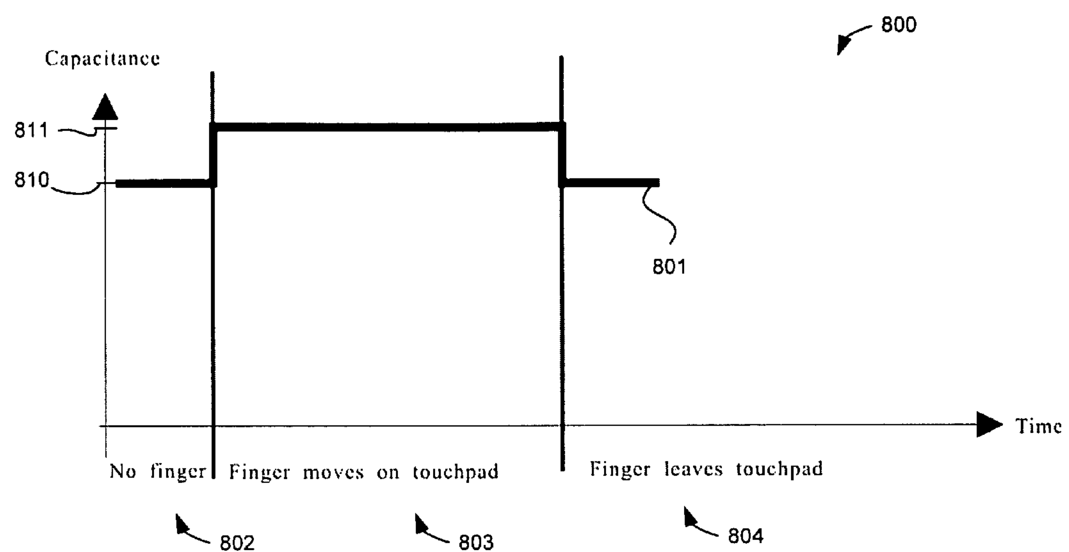
FIG. 8A illustrates a graph of one embodiment of a capacitance of a conductive object on a sensing device with respect to time.

FIG. 8A illustrates a graph of one embodiment of a capacitance of a conductive object on a sensing device with respect to time. As previously described, processing device 210 measures the capacitance on one or more sensor elements of the sensing device (e.g., touch-sensor pad, or touch-sensor slider). Graph includes one embodiment of a signal that represents capacitance 801 measured on the sensing device with respect to time. Capacitance signal 801 is at a first level, level 810, when no conductive object (e.g., finger or stylus) is present on the sensing device. Capacitance signal 801 is at a second level, level 811 when a conductive object is present and/or moves on the sensing device. Similarly, as the conductive object is no longer present on the sensing device, the capacitance signal 801 goes back to the first level, level 810.

Figure 8B:
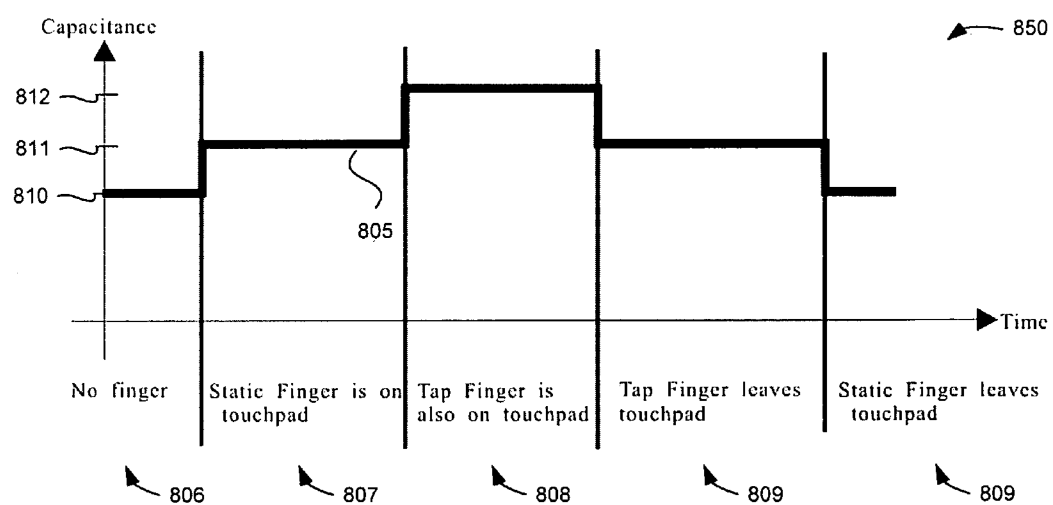
FIG. 8B illustrates a graph of one embodiment of capacitance of two conductive objects on a sensing device with respect to time.

FIG. 8B illustrates a graph of one embodiment of capacitance of two conductive objects on a sensing device with respect to time. Graph includes one embodiment of a signal that represents capacitance 805 measured on the sensing device with respect to time. Capacitance signal 805 is at a first level, level 810 when no conductive object (e.g., finger or stylus) is present on the sensing device. Capacitance signal 805 is at a second level, level 811, when a first conductive object (e.g., static finger) is present and/or moves on the sensing device. Capacitance signal 805 is at a third level, level 812, when a second conductive object (e.g., tap finger) is present and/or taps on the sensing device. Similarly, as the second conductive object is no longer present on the sensing device, the capacitance signal 805 goes back to the second level, level 811. As the first conductive object is no longer present on the sensing device, the capacitance signal 805 goes back to the first level, level 810.

Signals 801 and 805 may be an average capacitance of a plurality of sensor elements on a sensing device. Alternatively, signals 801 and 805 may be the capacitance as measured on one sensor element of the sensing device.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:

detecting a presence of a first stationary conductive object at a sensing device;

detecting a presence of a second conductive object at the sensing device while the first conductive object is present at the sensing device;

detecting a tap of the second conductive object while the first stationary conductive object is present at the sensing device, wherein a time duration of the tap is less than a threshold time; and recognizing a gesture based on the detected presence of the first stationary conductive object, the detected tap of the second conductive object, and a direction, along an axis, of a difference between a position of the first stationary conductive object and a position of the second conductive object, wherein recognizing the gesture comprises:

recognizing a tap gesture of the second conductive object;

determining a first position of the second conductive object; and recognizing a scroll gesture based on the presence of a first conductive object, the first position and the tap gesture.

2. The method of claim 1, wherein recognizing the gesture comprises:

recognizing a scroll gesture based on the direction.

3. The method of claim 1, wherein detecting each presence of the first and second conductive objects comprises determining a capacitance of the conductive object on the sensing device over time, and wherein recognizing the gesture is based on the capacitance of the sensing device at least a first time and a second time.

4. The method of claim 1, wherein detecting the presence of the first and second conductive objects comprises:

determining a capacitance of each of a plurality of sensor elements of the sensing device; and determining an average capacitance based on the capacitance of each of the plurality of sensor elements, wherein recognizing the gesture is based on the average capacitance.

5. An apparatus, comprising:

a sensing device having a plurality of sensor elements to detect presences of first and second conductive objects; and a processing device coupled to the sensing device, wherein the processing device is operable to recognize a gesture based on the presences of the first and second conductive objects, wherein the processing device is operable to recognizing the gesture by detecting a tap of the second conductive object independent of a location of the first conductive object and while the first conductive object is substantially stationary in proximity to the sensing device, wherein a time duration of the tap is less than a threshold time, and wherein the processing device is further configured to recognize the gesture based on a direction, along an axis, of a difference between a position of the first substantially stationary conductive object and a position of the second conductive object, wherein the processing device is operable to determine the position of the second conductive object, and to recognize a scroll gesture based on the presence of the first conductive object and the position of the second conductive object.

6. The apparatus of claim 5, wherein the processing device comprises one or more capacitance sensors coupled to a plurality of sensor elements of the sensing device, and wherein the one or more capacitance sensors are operable to measure capacitance on each sensor element.

7. The apparatus of claim 6, wherein each of the one or more capacitance sensors comprises a relaxation oscillator coupled to the plurality of sensor elements, wherein the relaxation oscillator comprises:

a current source to provide a charge current to the plurality of sensor elements:

a selection circuit coupled to the plurality of sensor elements and the current source, wherein the selection circuit is configured to sequentially select a sensor element of the plurality of sensor elements to provide the charge current and to measure the capacitance of each sensor element of the sensing device;

a comparator coupled to the current source and the selection circuit, wherein the comparator is configured to compare a voltage on the selected sensor element and a threshold voltage; and a reset switch coupled to the comparator, current source, and selection circuit, wherein the reset switch is configured to reset the charge current on the selected sensor element, wherein the one or more capacitance sensor further comprises a digital counter is configured to count at least one of a frequency or a period of a relaxation oscillator output received from the relaxation oscillator.

8. The apparatus of claim 7, further comprising a component external to the processing device, wherein the processing device is configured to send data to the component when the gesture is recognized.

9. The apparatus of claim 8, wherein the component external to the processing device is at least one of a processor, a driver of a processor, or an embedded controller.

10. The apparatus of claim 8, wherein the data is at least of a command or a signal.

11. The apparatus of claim 5, wherein the conductive object is at least one of a finger or a stylus.

12. The apparatus of claim 5, wherein the sensing device is at least one of a touch-sensor pad, or a touch-sensor slider.

13. An apparatus, comprising:

means for detecting presences of a first conductive object and a second conductive object on a sensing device;

means for detecting a tap of the second conductive object while the first conductive object is substantially stationary on the sensing device, wherein a time duration of the tap is less than a threshold time;

means for recognizing a gesture based on a direction, along an axis, of a difference between a position of the first conductive object that is substantially stationary and a position of the detected tap of the second conductive object;

means for determining the position of the second conductive object; and means for recognizing a scroll gesture based on the presence of the first conductive object and the position of the second conductive object.

14. The apparatus of claim 13, further comprising means for increasing a sensing surface area of the sensing device.

* * * * *